United States Patent [15] 3,664,888
Oga et al. [45] May 23, 1972

[54] METHOD OF RESIN COATING A METAL AND RESIN-COATED METAL PRODUCT THEREOF

[72] Inventors: Toshisaburo Oga, Kobe; Ken Okazaki, Amagasaki, both of Japan

[73] Assignee: Sumitomo Electric Industries, Ltd., Osaka, Japan

[22] Filed: Feb. 24, 1970

[21] Appl. No.: 13,451

Related U.S. Application Data

[62] Division of Ser. No. 584,223, Oct. 4, 1966, Pat. No. 3,563,785.

[30] Foreign Application Priority Data

Oct. 9, 1965 Japan....................................40/61681
Nov. 27, 1965 Japan....................................40/72577
Nov. 27, 1965 Japan....................................40/72578
Sept. 17, 1966 Japan....................................41/61596
Sept. 22, 1966 Japan....................................41/62764

[52] U.S. Cl..........................148/6.27, 117/49, 117/132 CF, 204/38 A, 204/38 E
[51] Int. Cl......................................................B44d 1/092
[58] Field of Search............117/132 CF, 49; 148/6.27, 6.14; 204/38 A, 38 E, 35 N, 37 R, 58

[56] References Cited

UNITED STATES PATENTS

| 3,115,419 | 12/1963 | Dale | 117/49 X |
| 2,878,659 | 3/1959 | Prance | 117/132 CF X |
| 2,540,962 | 2/1951 | Puppolo | 117/132 CF X |
| 2,980,965 | 4/1961 | Infantino et al. | 117/132 CF X |
| 3,406,106 | 10/1968 | Garwood | 148/6.27 X |
| 2,647,079 | 7/1953 | Burnham | 204/38 A |
| 3,033,008 | 5/1962 | Davis | 117/49 X |

Primary Examiner—Ralph S. Kendall
Attorney—Carothers and Carothers

[57] ABSTRACT

The method of coating an aluminum or aluminum alloy surface with a resin wherein the surface is anodically etched in a halide solution to provide minute surface irregularities and cavities to adequately anchor the resin to be applied. The etched surface may be oxidized to provide greater anchorage and may also be heat treated with hot water or steam either prior or subsequent to resin coating to further enhance the resin bondage and service life.

10 Claims, 4 Drawing Figures

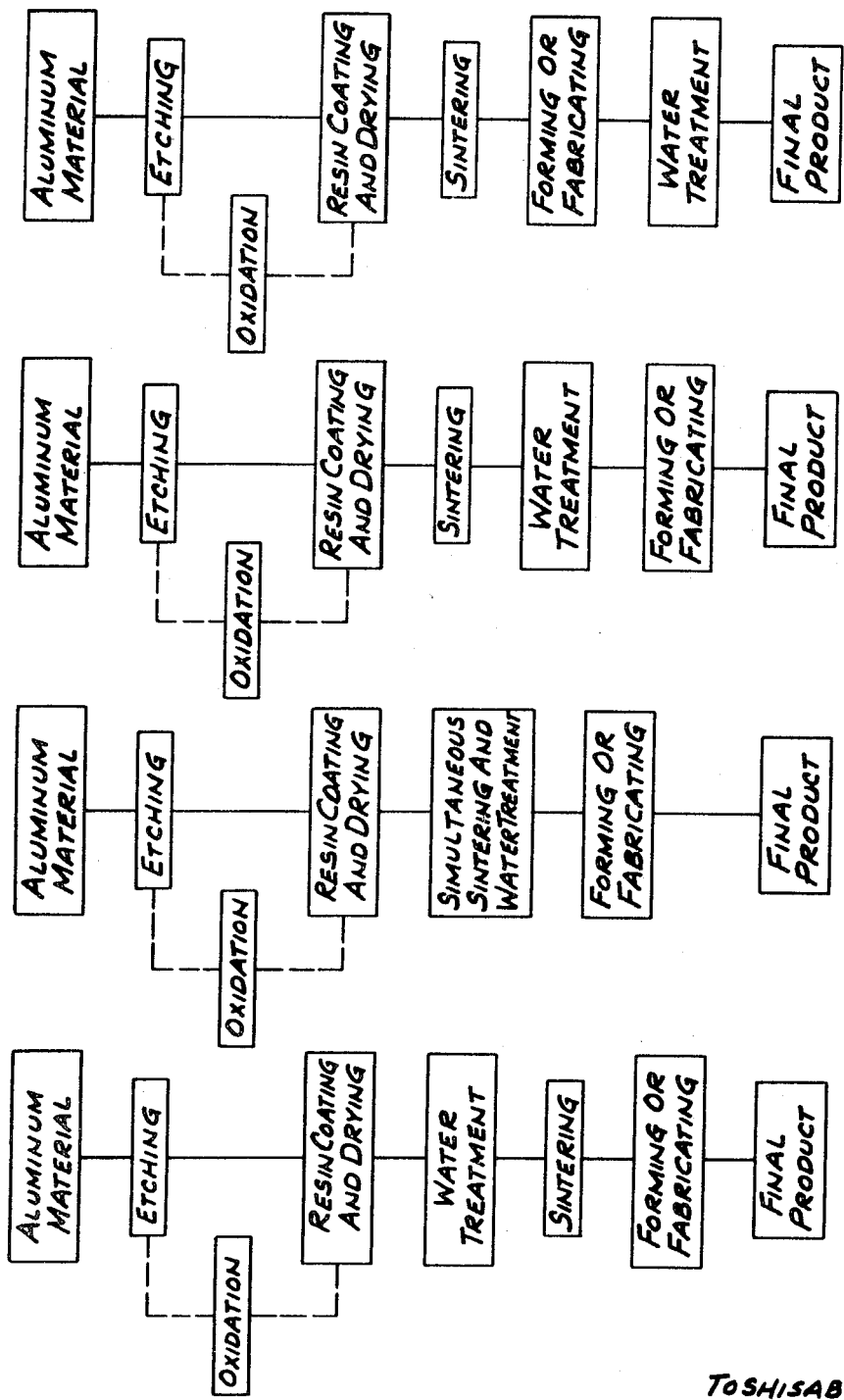

METHOD OF RESIN COATING A METAL AND RESIN-COATED METAL PRODUCT THEREOF

CROSS-REFERENCE TO RELATED APPLICATION

This is a division of patent application Ser. No. 584,223, filed Oct. 4, 1966 entitled "Method of Resin Coating of the Metal and Resin-Coated Metal Product Therefor" now U.S. Pat. No. 3,563,785 issued Feb. 16, 1971.

The present invention relates in general to a method of coating a metal or metal alloy surface with a resin and more particularly to a method of coating aluminum or an aluminum alloy with a resin. It is the primary object of this invention to provide not only an economical method of making a highly excellent resin-coated product of aluminum or aluminum alloy, but also the method of producing a product with improved ease of quality control.

Another object of the present invention is to provide an improved coating process wherein the coating of the surface of aluminum or an aluminum alloy with a resin is assured bonding primarily by mechanical anchorage between the resin and the surface of the aluminum or the aluminum alloy, the former being caused to penetrate into the fine surface irregularities and numerous small cavities on the surface of the latter.

The method of bonding of the present invention can be used advantageously to coat the aluminum or aluminum alloy with a resin having a poor adhesive characteristic, such as a polyolefin or fluorocarbon resin which are reluctant to bond either upon direct application thereof to the metal surface or indirectly through an intermediate agent or adhesive. It is evident that the method of the present invention is also applicable to any other resins.

As is well known, a fluorocarbon resin is one of the resins most reluctant to provide satisfactory bonding. It is to be emphasized that the invention herein disclosed definitely offers the most preferred application when resin coating of the metal is to be made with a resin of the above described poor adhesive qualities.

Another object of the invention is to provide an improved method of coating the aluminum surface with a resin with improved bonding assured by numerous small cavities and surface irregularities created in the metal surface mechanical anchorage the resin coating to the metal surface. A method of mechanical bonding as described is already known and is described in U.S. Pat. No. 2,944,917 which proposes a method of coating the metal surface which is roughened chemically by etching with acid to provide the surface irregularities suitable for bonding the resin to the metal surface.

The present invention provides a much more economical method of coating the metal with a resin, when compared with the conventional method as previously described. The method according to this invention permits a resin coating to be applied in a very short time with the utilization of an unusually inexpensive etching material. Additional important advantages are provided by the very high degree of quality control obtainable which enables uniform quality for mass production and simplifies partial coating, for example, coating of one side only of a plate. The invention also assures an appreciably improved smoothness of the coated surface as compared with the result obtained from conventional methods. Ease of selection of the proper material and equipment required for performing the etching or surface treatment is facilitated.

Another object of the present invention is to provide a metal product coated with a resin having an extremely excellent coating quality.

The excellent coating obtained by the present invention may be broken down into qualities of the following descriptions.

First, the high quality of the resin coating may be realized by treating the aluminum surface to preroughen the same for successful coating thereof by using a chemical or electrochemical process and subsequently allowing a layer primarily of aluminum oxide or a hydrate thereof to build up on the aluminum surface to which the resin coating is to be applied.

The resin coating so obtained has been found to be characterized by a drastic improvement in wear resistance and compressive strength and is capable of preventing any corrosion on the surface of the basic metal or aluminum. Such corrosion normally results from the penetration of a corrosive substance through the resin film, which is unavoidable in view of pinholes present in very thin resin film. The durability of coating and increased range of application or improved versatility of the finished product is thus insured.

The resin coating of aluminum on one side alone has recently become popular. The other side of exposed aluminum is normally treated for corrosion prevention pursuant to an anodizing or chemical process. The resin coating process according to the present invention is also compatible with this popular process, while the conventional coating method is less desirable because use thereof always causes surface irregularity in the resin coating created by local chemical reaction originating from the pinholes therein unless an additional protective coating has been properly applied.

Secondly, the quality of the resin coating realized by additional chemical treatment applied in accordance with the teachings of the present invention contributes greatly to quality improvement. This invention has been found valuable in the use of fluorocarbon resin coatings, especially in the making of kitchen utensils which are employed under severe working conditions, and is extremely effective in improving the oil resisting properties of the resin-coated metal in the prevention of discoloration and staining of the coating resulting from use for a prolonged period, and in assuring an improved corrosion resistance. These advantages jointly enable one to provide a resin-coated product having unusually high service performance as well as improved durability.

Other objects and advantages appear hereinafter in the following description and claims.

The accompanying drawing shows, for the purpose of exemplification without limiting the invention or the claims thereto, certain practical embodiments illustrating the principles of this invention wherein:

First, the embodiment of the present invention will be mentioned with respect to the method of providing an excellent resin-coated metal characterized by great strength of bonding of the coating film to the base metal, namely aluminum or aluminum alloy, ease of coating the metal on one side, or a portion thereof only, improved surface smoothness of the coating, economy in related treatment or treatments and large ease of quality control.

In methods heretofore known for coating the aluminum or aluminum alloy with the film of a resin, the chemical surface treatment was first applied to the metal surface, as proposed in U.S. Pat. No. 2,944,917, by resorting to the etching of the metal surface with acid such as hydrochloric acid to assure the improved bonding between the resin coating and the base metal to be coated, followed by coating of the prepared metal surface with the resin. When the surface coating is to be made of a fluorocarbon resin, such as, polytetrafluoroethylene (hereinafter abbreviated as P.T.F.E.) or a resin of a copolymer type made from tetrafluoroethylene-hexafluoropropylene (hereinafter abbreviated as F.E.P. resin), a high reluctance to bond exists. A conventional method of applying such a resin to the metal surface is such that the surface of the base metal is previously treated chemically as mentioned previously or that a resin dispersion containing chromic acid, phosphoric acid, sulfuric acid or the like is applied to the metal surface, which may or may not have been previously mechanically treated pursuant to the so-called primer coating method.

It should be noted that the conventional chemical process for pre-treatment of the metal surface for coating, employing an acid such as hydrochloric acid or the like, has an inherent defect of causing excessive roughness of the treated metal surface, is adequate bonding strength is to be assured, with the result that the surface of resin coating is extremely rough when the coating is built up by successive thin films of resin. Furthermore, the use of acid necessitates washing of the metal surface after treatment by acid-etching to prevent the possibility of continued metal corrosion etching which occurs in the absence of less than perfect washing. It is thus necessary to use special and expensive equipment for surface treatment which must have extensive resistance against attack by acid means to shield the exposed metal surface for protection against chemical attack in the form of acid etching when the metal is to be coated only on one side or locally. Also, application in the factory, a very long period of surface pre-treatment for obtaining the satisfactory resin-metal bonding is required. Difficult control of the adhesiveness of the resin coating as well as the short service life of the treating solution represent critical economical disadvantages for a good quality control.

Another disadvantage of coating with a fluorocarbon resin, for example, P.T.F.E., pursuant to the primer coating process is the large decrease of available bonding strength due to the presence of water, moisture or the like, resulting presumably from the chemical reaction related to the chromic acid, phosphoric acid, sulfuric acid or the like.

As already mentioned, the primary object of the present invention is to provide a method of coating the surface of aluminum or an aluminum alloy with a resin, which provides the desired advantages of a very smooth coating surface, high bonding strength, reduced time required for completion of surface treatment, high resistance to corrosion, improved economy and an extreme ease in producing and controlling the bonding between he coating resin and base metal.

The second object is to provide a simple method of coating the metal with a resin only on one side or locally, according to the teachings that the metal to be coated is anodically etched on the surface thereof by immersion in the electrolyte comprising one or more of the chlorides, bromides or iodides, and then coated with a solution or dispersion of thermoplastics, thermoplastics in molten state or uncured thermosetting resin on the prepared surface of the base metal. This method of surface coating can be employed with the assurrance that a high degree of bonding of the coating will be effected even with a resin having extremely poor bonding properties, such as, a fluorocarbon resin, for example, P.T.F.E. or F.E.P. resins or polyolefin resins such as polyethylene. For successful coating of the aluminum metal only on one side or locally according to the method of this invention, anodic etching is applied to the metal surface to be treated and the portion of the surface not requiring the resin coating is kept in face contact with a suitable insulating material or with a metal potentialized equally to the metal to be etched thereby eliminating any need for tight shielding. The etching can be accomplished by direct current to the aluminum or aluminum alloy as an anode which is kept immersed for a period in an aqueous solution containing one or more chlorides, such as, hydrochloride, ammonium chloride, sodium chloride, potassium chloride, calcium chloride, zinc chloride, aluminum chloride, hypo sodium chloride or the like, or such iodides as sodium iodide, ammonium iodide, hydro iodide or the like.

The coating resin used, such as, thermoplastic resin as polyvinyl chloride, polyethylene, P.T.F.E., F.E.P. resins or the like, or a thermosetting resin such as phenolic resin, epoxy resin or the like, is applied to a portion of the metal surface which has been anodically etched with the direct current as previously described. Following the surface treatment, drying is required where a resin solution is employed, or in the instance where resin dispersion is employed, drying and subsequent sintering at a fusion temperature is required. When a molten resin is employed, cooling is carried out after application, and where an uncured thermosetting resin is used, curing is applied, to provide a resin coating having a high degree of bonding to the surface of the base metal.

There are various practical methods of resin coating, namely, spray coating, roller coating, dip coating, flow coating, brushing and others where the resin is in a liquid form such as a solution, dispersion, suspension, or the like to achieve the object of the invention. Where the coating resin is of the fluorocarbon type, such as, P.T.F.E., F.E.P. resins or the like, joint use of the so-called primer containing dissolved chromic acid, phosphoric acid, sulfuric acid or the like mixed with the dispersion of the resin may be employed. Quality improvement of the coating resin may also be accomplished by addition of an inorganic filler, such as, a metallic powder, metallic salt or the like to the dispersion.

In the situation where one side or a portion of the surface of the aluminum or aluminum alloy product is not to be coated, said portion is previously face-contacted with a suitable insulating material to prevent anodic etching, or the metal is potentialized equal to the metal to be etched, to provide a resin coating surface on the portion of the metal surface not face-contacted with said insulating material. A good resin coating is easily obtained on one side or portion of the metal surface while the remainder of the surface is kept in face contact with the insulating material to prevent it from being etched anodically from this type of surface treatment. In spite of presence of the etching solution between the insulating material and the metal surface, etching will rarely occur and then only if the smooth flow of the etching current is interrupted. Thus, one of the advantages of the present invention is the elimination of the need for perfect shielding of the surface portion of the base metal requiring no etching, unlike conventional methods where use of acid or other chemicals is involved. Anodic etching should preferably be performed with direct current only, because use of mixed d.c. and a.c. current never contributes to the improvement of the available bonding strength of the obtained resin coating of the metal surface as will be described in Example XI of the embodiment of the invention.

The invention may be illustrated by the following Examples which represent only a portion of the applicable range of the invention, and accordingly should never be construed as limiting the applicable scope of the invention.

| Example No. | Concent. (Cl, Br, I) | Electrolyte | Bath temp. (° C.) | DC voltage (v.) | Current density (a./dm.²) | Q.E. (c./cm.²) | Metal | Resin | Peel strength (kg./25 mm.) |
|---|---|---|---|---|---|---|---|---|---|
| I | 1 | HCl | 50 | 5 | 5 | 6 | 99% Al | P.T.F.E. | 2.0 |
| II | 2 | NH₄Cl | 30 | 5 | 10 | 26 | 99% Al | P.T.F.E. | 4.0 |
| III | 2 | NaCl | 80 | 12 | 30 | 20 | 52S Al-alloy | | |
| IV | 3 | KCl | 40 | 9 | 20 | 15 | 99% Al | F.E.P. | 2.5 |
| V | 2 | NH₄Br | 80 | 10 | 30 | 20 | 99% Al | P.V.C. | 3.0 |
| VI | 1 | NaCl | 50 | 15 | 15 | 50 | 52S Al-alloy | P.V.C. | 2.8 |
| VII | 1 | NH₄Cl | 50 | 5 | 5 | 25 | 52S Al-alloy | P.E. | 1.7 |
| VIII | 1 | NH₄Cl | 50 | 5 | 5 | 25 | 52S Al-alloy | P.E. | 1.2 |
| IX | 1 | NH₄Cl | 50 | 5 | 5 | 25 | 52S Al-alloy | P.V.C. | 1.2 |

NOTE.—P.V.C.=Polyvinyl chloride; P.E.=Polyethylene; Q.E.=Quantity of electricity; F.E.P.=F.E.P. resin.

In the above table, P.T.F.E. is the applied resin for Examples I, II and III and F.E.P. for Example IV, and the values represent data concerned with the application of the aqueous dispersion which is applied, dried at 250° C and sintered at 350° C after drying. Those entries in Examples V and VI give the data of polyvinyl chloride paint applied and dried, and those in Example VII stand for the data in connection with the resin coating of the metal surface with a xylene solution of polyethylene which is applied, dried and baked. Those values in Examples VIII and IX show the results of a resin coating of a polyethylene sheet and a polyvinyl sheet applied, under pressure, at 120° C and 125° C, respectively, to the anodically etched surface of aluminum.

EXAMPLE X-A

After being immersed in the aqueous solution of sodium chloride having a concentration of 2% Cl (bath temperature: 40° C) and anodically etched at a d.c. voltage of 10V, current density of 20A/dm$^2$ and quantity of electricity of 20 coulomb/cm$^2$ with an insulating plate of phenol resin applied in face contact with a portion of the surface, a portion of the specimen surface of 99 percent aluminum which was kept in face contact with said plate was found to be barely etched. The etched portion of the metal surface was coated with an aqueous despersion of P.T.F.E., dried and then sintered at 350° C, with the result that the bonding strength of the local resin coating was measured by a peeling test wherein the bonding strength was determined to be over 3.2kg/25mm. For holding the insulating plate previously mentioned, in face contact with the base metal, shielding with packing or a similar substance is not necessary. Despite the presence of the electrolytic solution between the insulating plate and the base metal plate of aluminum, the metal surface in face-contact with said insulating plate will remain unetched, although current has been applied to the aluminum plates. The peeling strength of the resin coating applied on the portion of the metal surface under the insulating plate was found to be 0.13kg/25mm which is quite similar to a P.T.F.E. coating (0.12 – 0.14kg/25mm) on an aluminum plate which is not etched.

EXAMPLE X-B

A square specimen (2mm × 300mm × 300mm) of 99 percent aluminum was employed, together with a polymethyl methacrylate plate (0.5mm × 300mm × 300mm) to be applied to one side as an insulating material. These two plates were jointed together by light face contact at their four corners and then the aluminum plate was anodically etched on the exposed side thereof which was used as an anode confronting the cathode with an applied d.c. current and under the same conditions as set forth in Example X–A. It is specially noted that only the exposed side of the aluminum plate was satisfactorily etched anodically, while the covered side of the same was found to be barely anodically etched even though the electrolytic solution was allowed to enter into and fill up the gap between the aluminum plate and the insulating plate which were only clamped lightly at their four corners. The anodically etched side of the aluminum was then coated with an aqueous dispersion of P.T.F.E., dried and finally sintered at 350° C, with a resultant resin coating having the measured peeling strength of over 3.2 kg/25mm. In another test, the side of the aluminum plate covered with an insulating plate, was coated with the fluorocarbon resin in the same manner as described above. The peeling strength of the so resultant resin coating was measured and found to be 0.13kg/25mm, which shows no difference from the peeling strength as compared with that of a resin coating on an unetched surface of aluminum.

EXAMPLE XI

After being treated by dipping in an aqueous solution of ammonium chloride having concentration of 2% Cl (bath temperature: 30° C) and anodically etched at a.c. voltage of 5V, current density of 10A/dm$^2$ and a quantity of electricity of 10 coulomb/cm$^2$, 99 percent aluminum specimen was then again etched at d.c. 5V, with a current density of 10A/dm$^2$ and an applied quantity of electricity of 16 coulomb/cm$^2$, in the same solution and on the same side as previously etched with an applied a.c. voltage and then coated with an aqueous dispersion of P.T.F.E. on the etched surface. The P.T.F.E. coating was dried and then sintered at 350° C with the result that the peeling strength of the resin coating was not more than 2.5kg/25mm, despite the fact that the applied quantity of electricity was equal to that used in the preceding Example II.

It was also found that application of mixed a.c. and d.c. current, too, provides the largest peeling strength of the resin coating below that realized by application of d.c. current only, should the applied quantity of electricity be equal thereto as in the case of anodic etching with d.c. current only.

EXAMPLE XII

A specimen plate of 99 percent aluminum was coated with the aqueous dispersion of P.T.F.E., the so called primer coating method, comprising 10 percent chromic acid, 7 percent phosphoric acid and 0.5 percent sulfuric acid, and was tested for peeling strength, with the result of 3.0kg/25mm. However, this was then found to reduce down to 1.3 – 1.7kg/25mm after immersion in boiling water for a continuous period of 1 hour. The peeling strength found for the coating of another specimen (Example II) was 4kg/25mm which suffered a very small drop down to 3.5kg/25mm even after immersion in the boiling water for a continuous period of 1 hour which illustrates the stability of the peeling strength as effected by immersion in the water of the resin coating obtained by applied anodic etching is much larger than that realized by the primer coating method.

According to the present invention, adequate bonding strength of the resin coating on the surface of the aluminum or aluminum alloy may be realized even with a small quantity of electricity applied, slightly more than 1 coulomb/cm$^2$, when this type of base metal has previously been etched anodically on the surface with an applied d.c. current, but the quantity of electricity to be applied should preferably be more than 5 coulomb/cm$^2$ for a more desirous result in bonding strength where actual use of the same is to be made on an aluminum product coated with the resin.

It is specially noted that, in practice, the concentration of any electrolyte comprising chloride, bromide and iodide may vary over a large range. In other words, surface etching of the base metal may be made with the diluted aqueous solution of the electrolyte having a very low concentration, say about 0.05 percent, for the purpose of carrying out the teachings of the present invention. But with said solution having a low level of concentration as described above, the treating time must be extended properly or the treating voltage must be raised accordingly in order to be assured of a practically acceptable result in the anodic etching. The current becomes reluctant to flow, because of the reduced conductivity of the electrolytic solution having a very low concentration. On the other hand, concentration in excess of 10 percent, say about 15 percent, is also acceptable for successful etching, and can provide a practically acceptable result by properly adjusting the voltage, current, treating time and other conditions.

It is, however, important that the concentration of the electrolyte previously mentioned should be selected to best suit the specifications of the rectifier, the shape of the aluminum to be surface-treated and other factors for each particular operation of surface treatment. Even a very low HCl concentration in the HCl solution, by which etching is ordinarily unsuccessful when the chemical processing resorts to a mere dipping of the aluminum according to the conventional method, may be accepted for successful surface-etching in a short period of time when performed pursuant to the present invention, which specifies use of electric current.

The surface-etching current is preferably d.c. current, and the greatest bonding strength can be obtained by use of a d.c. current alone, and not by use of both a.c. and d.c. currents at the same time or at different times as described in the Example XI. Coating of the metal surface with the resin may be made in the state of a solution, a dispersion, a suspension or others of the thermoplastic resins, or by coating, under pressure, a molten thermoplastic resin or with a combination of more than two of these methods and by use of uncured thermosetting resins and others. Of all these methods of resin coating, application of solution, dispersion or suspension, which deals with the resin at a lower viscosity, ensures a greater bonding strength of the resin coating to the metal surface, because the resin can more readily fill up the fine surface irregularities or small cavities in the metal surface (Examples V, VI, VII, VIII, IX). The improved ease with which the resin in a fluid state at a lower viscosity can fill up the surface irregularities seems to be attributable to a greater anchoring effect of the arrested resin in the state of solution, dispersion, suspension or the like, having generally lower viscosity. Accordingly, greater ability is attributed to the resin to penetrate deep into the very complicated and fine surface irregularities and numerous pinhole cavities in the surface of base metal, aluminum, pre-treated by anodic etching than possible with a molten rising and eventually provides great bonding strength.

Desirable advantages offered by the invention may be described as follows:

1. In comparison with the conventional chemical methods of surface coating, for example, the hydrochloric acid process, the surface of the resin coating is more smooth and sleek, meaning a drastic improvement in surface finish for a given bonding strength of the coating. This is presumably because the irregular removal of aluminum takes place over almost the entire surface thereof as a result of the application of electro-chemical treatment, or anodic etching, thus establishing an excellent surface having very fine irregularities and numerous pinhole cavities. Individual cavities can be quite deep (depth: max. about $50\mu$, usually about $10\mu - 20\mu$), thus assuring a resin coating of great bonding strength even when the elution of aluminum is comparatively small. Unlike the surface treatment in accordance with the present invention, the conventional method cannot assure the metal surface to have cavities therein with a depth sufficient enough to provide a good anchorage of the coating resin when the aluminum elution is small, and accordingly requires much more elution of aluminum than when the surface treatment is carried out electro-chemically. This in turn results in the added coarseness of the surface irregularities and pinhole cavities which seems to be a cause of reduced quality of a resin-coated surface of aluminum in the prior art, with respect to smoothness, sleekness and the like, as compared with the same resulting from the electro-chemical method of surface treatment pursuant to the present invention. Therefore, for the overlapping method, utilizing hydrochloric acid is less recommendable, because it provides a poor adhesion of the overlapping second resin applied with the roller. A large surface of the underlying resin coating is applied with hydrochloric acid which in turn allows a small air gap to appear between the two layers of resin.

A second resin coating of the aluminum accomplished in accordance with the present invention has a much greater smoothness of surface for a given bonding strength, which in turn assures a correspondingly improved overlap coating bond to the underlying surface coating resin to the base metal of aluminum or an aluminum alloy with no small air gaps whatsoever included between them.

2. The surface after treatment pursuant to the present invention is highly smooth and sleek, but the underlying surface irregularities and pinhole cavities are very fine and deep, thus ensuring the improved effect of anchoring arrest and a very large peeling strength of the coating resin. For example, a maximum peeling strength of P.T.F.E. resin was found to be as large as 5.8kg/25mm. Moreover, the bonding strength realized by the use of the teachings of the present invention, is highly resistant to reduction by the effect of humidity and moisture, as was confirmed by the testing wherein the resin coating was dipped into boiling water for a continuous period of 1 hour. A preservation of a 90 percent level of bonding strength before testing was obtained, while an intolerably large drop of the bonding strength down to 40 - 60 percent after the same testing as above was observed for a resin coating applied in accordance with the conventional primer method (Example XII).

3. Elution of metal out of the surface of the base metal, the aluminum, is in proportion to the quantity of electricity applied for surface treatment by anodic etching, while the strength of bonding between resin and aluminum is roughly dependent on the quantity of aluminum removed by elution. But, it is to be noted that in a region of a very high bonding strength, the available bonding strength is saturated at a nearly constant level, and becomes less dependent on the elution of aluminum. But, for the region of bonding strength acceptable for practical application of the resin coating, available bonding strength may be determined by controlling the elution of aluminum. Reaction of the aluminum elution is stopped to cease the progress of surface etching as soon as the etching current is cut off. Therefore, control of the elution of the aluminum through control of the electricity applied from outside for etching, enables a free control of the obtained bonding strength. One practical method of controlling the electricity is, for example, adjustment of the current and time duration of anodic etching, or the like. Other suitable methods may be available. This control, whatever type is employed, can be accomplished with extreme ease, and accordingly highly contributes to the ease of operation of the surface treatment and the quality control in exercising the teachings of the invention.

On the other hand, with respect to the conventional chemical methods of surface treatment such as the hydrochloric acid process, etching speed varies appreciably, depending on the temperature of the etching solution, the decrease of etching speed when the acid solution has aged or fatigued due to continuous or repeated use thereof. Furthermore, the reaction lasts even after termination of dipping, unless washing with water is done immediately after dipping. Thus, control of the available bonding strength is a matter of extreme difficulty with the conventional methods.

4. As described in the preceding portion (3), the available bonding strength can be controlled by the applied quantity of electricity, according to the teachings of the present invention. This means that an increase of current density enables the time required for completion of surface treatment to be reduced, and a satisfactory bonding strength can be accomplished in a very short time, usually less than 5 minutes and even less than 1 minute.

On the other hand, according to the conventional chemical method of surface treatment, for example, the hydrochloric acid process, the shortest possible time to complete the surface treatment is limited, despite a rise of the concentration of hydrochloric acid, and cannot be less than 5 to 15 minutes.

5. The electro-chemical process according to the present invention enables successful surface treatment with the electrolytic solution of low concentration. When the aqueous solution of aluminum chloride is utilized, eluted or removed, aluminum appears as a precipitated aluminum hydroxide. Any change with respect to the deposited aluminum hydroxide does not appreciably affect the available effect of the etching, and accordingly a very long life of the solution can be assured. The need for temperature control is eliminated, if the quantity of electricity is properly controlled, and treating time can be reduced, meaning that the required watt hours are comparatively small which in turn means an appreciable reduction of operating costs for surface treatment. The conventional chemical process of surface treatment, however, involves the use of an etching solution having a high concentration of hydrochloric acid (approximately 15 percent). Immersion of the aluminum for surface etching results in a quick fatigue of the solution as well as reduction of effectiveness of etching which necessitates frequent renewal of the solution. Another disadvantage is that a long time is needed for completion of the etching. All of this means an expensive surface treatment when done in accordance with the conventional process of treatment which resorts to the chemical method.

6. An additional disadvantage inherent to the conventional chemical process for surface etching, for example, with the hydrochloric acid, is that all the metal surfaces subject to direct exposure to the etching solution are etched, so that for resin coating only on one side or locally, a portion of metal surface not requiring surface etching must be sealed off from the etching solution by applying a suitable protective painting, rubber packing or similar device for complete shielding. According to the present invention, however, an aqueous solution of salt or highly diluted acid is employed; therefore, the probability of etching the metal surface by the solution itself is extremely small, and direct contact of the electrolytic solution with a portion of the surface not requiring the etching is quite permissible. Control of the current is all that is required and the portion not requiring etching which is left unshielded is barely affected, thus providing a great ease with which a resin coating only on one side or locally can be accomplished and a large operational convenience for the surface treatment of the metal.

In addition, quality improvement of the resin coating by addition thereto of a filler, such as pigment, metallic powder, oxide of metal or other inorganic substance, is readily accomplished, and when the coating resin is of the fluorocarbon type, for example, P.T.F.E., the available bonding strength can be further raised, if chromic acid, phosphoric acid, sulfuric acid or the like is added to the present invention, as described above, is applicable to the manufacture of all types of products such as resin-coated foil or the like made of aluminum or aluminum alloy, and especially aluminum or aluminum alloys coated with the fluorocarbon resin. For example, P.T.F.E., applied in accordance with the present invention, can be advantageously used for applications where nonstickiness of the resin coating is the primary concern such as for kitchen utensils, ball bearings and others, by virtue of the characteristic heat resistance, anti-stickiness and low frictional coefficient of the coating material.

Hereinafter follows the description as to a second embodiment of the present invention related to the method of making a resin-coated product with the object of obtaining a resin coating on aluminum or an aluminum alloy with an excellent wear resistance, compressive strength and corrosion resistance. As already mentioned concerning the preceding embodiment of the present invention, the resin coating of the aluminum or aluminum alloy can be accomplished in accordance with the chemical process, for example, dipping in the aqueous solution, an electro-chemical process such as previously described in detail, pursuant to which first the very fine surface irregularities and numerous pinhole cavities are caused to appear in the surface of the base metal of aluminum and the resin coating is thereafter applied.

It should, however, be noted that when the aluminum or aluminum alloy having the fine surface irregularities and numerous pinhole cavities is covered with a direct coating of the resin, these irregularities and cavities are highly subject to reduction, especially when the thickness of resin coating is in the order of less than $50\mu$, by a large frictional, compressive or other force applied from outside, because the hardness of aluminum is relatively low, resulting in the occurrence of a relative displacement between the base metal of aluminum and the resin coating which provides a great possibility of breaking the coating and sometimes causes even a substantial decrease of the bonding strength. When a very thin resin coating is applied, pinholes may often be present in the coating resin and pose a grave problem of aluminum corrosion which is highly liable to occur, as noted by the inventors, in such a manner that, with the resin coated aluminum surrounded by a corrosive atmosphere, for example, dipped in 3 percent aqueous solution of NaCl, corrosive attack is applied to the metal through the thin coating resin, or more exactly, through the pinholes in said resin.

One of the objects of the present invention is the provision of a resin coating applied to the base metal or aluminum or aluminum alloy, having a satisfactory strength of bonding to said base metal and free from a decrease of the realized bonding strength, by virtue of an unusually large wear resistance and compressive strength.

When the surface of aluminum or aluminum alloy is to be coated with the resin, the metal surface having the fine irregularities and numerous pinhole cavities created by application of a chemical process, electro-chemical process (for example, in pursuant to the invention already described in detail hereinabove) or other suitable process, is comparatively soft and fragile and accordingly fine surface irregularities and numerous pinhole cavities are highly liable to reduction by the application of large mechanical load, friction or compression applied from the outside often causing a relative displacement between the resin coating and base metal of aluminum or aluminum alloy, surface damage, spalling, cleavage, flaking and a decrease of the bonding strength, especially when the thickness of the resin coating is in the order of less than $50\mu$.

Research and a series of experiments made by the inventors have been successful in providing a new method of resin coating the surface of aluminum or an aluminum alloy which assures an unusually high wear resistance and reluctance to a decrease in the bonding strength and corrosion due to penetration of the corrosive atmosphere. When the aluminum, or alloy thereof, is surface-treated in accordance with the conventional method of surface coating, corrosion thereof is highly liable to occur when said metal is exposed to the corrosive atmosphere such as salt or others, due to characteristic permeability of a plastic and the presence of pinholes in the film of the coating resin. The present invention provides a surface coating on the aluminum or aluminum alloy with the plastic resin which is devoid of these disadvantages. The invention involves essentially a first stage or step of surface processing the aluminum or aluminum alloy, which has previously been treated so that the surface thereof is roughened to show the fine irregularities or cavities effective for ensuring a good bonding of the coating produced in a manner already described, to establish an anodized oxide film in accordance with the electro-chemical process or an aluminum oxide film in accordance with a chemical process; and a second stage for coating the oxide-coated aluminum or aluminum alloy with a second layer consisting of a resin film. More specifically, (1) the surface of the aluminum or aluminum alloy is pre-treated to have the fine irregularities and numerous pinhole cavities for anchoring of the resin coating by a chemical process or electro-chemical process (which has already been disclosed in detail hereinbefore and probably also others), or a combination of these two or the like; for example, and (2) the surface so pre-treated is then coated with aluminum oxide in accordance with an anodizing process, with the base metal of aluminum or aluminum alloy dipped in an aqueous solution containing sulfuric acid, oxalic acid, chromic acid, sulpho-salicylic acid, sulpho-phtalic acid, phenol sulphonic acid or other solutions capable of developing the oxide film on the surface of said base metal. With the application of either or both a.c. and d.c. current, or in accordance with a chemical process, pursuant to which the base metal of aluminum or aluminum alloy if, for example, heated in the heated water or exposed to the steam, or treated by dipping in the aqueous solution of the potassium dichromate or mixture of potassium chromate and sodium carbonate at 85° – 100°C or otherwise; and (3) the oxidized metal surface of aluminum or aluminum alloy is then put in boiling water or steam for sealing. (Generally, chemical or electro-chemical treatment of the surface of the aluminum or the aluminum alloy for the purpose of oxidation gives rise to establishment of the aluminum oxide on said treated surface, and the aluminum oxide so established is highly porous, but the original porosity is removed when hydrated with the boiling water, resulting in conversion of said porous body into a tight and rigid mass having an excellent corrosion resistance. Treatment of such hydration is technologically termed as "-sealing"). It is finally coated with the thermoplastic resin such as a polymer, for example, polyvinyl chloride, polyethylene, P.T.F.E. or a F.E.P. resin in the form of a solution, dispersion, suspension, fusion, or an uncured thermosetting plastic or the like, when the coating resin must be highly wear resistant and corrosion resistive. For application of a resin in the form of dispersion or suspension, the sintering is made at a temperature above the melting point of the resin, and for application of an uncured thermosetting resin, curing is made at a raised temperature. For application of other resins, setting is done by natural cooling and forced cooling in order to obtain an excellent resin coating having a large bonding strength and wear resistance combined with a small decrease in bonding strength due to friction as well as an improved corrosion resistance.

The above-mentioned second embodiment of the present invention for the method of resin coating an aluminum or aluminum alloy specimen provides the best result of surface coating, when the thickness of the resin coating is of an order of less than about $50\mu$.

An example of this embodiment of the present invention is set forth hereinafter. It is to be noted that the example to be described hereinbelow covers only a portion of the invention and should never be construed as limiting the applicable range of the invention.

EXAMPLE XIII

A 99 percent aluminum plate was first kept submerged in a 15 percent aqueous solution of a hydrochloric acid for a continuous period of 5 minutes for surface etching. It was then transferred into a 5 percent aqueous solution of sulfuric acid at a temperature below 30° C for anodizing at d.c. 5 – 30 volts and so continued for a period of 30 minutes for surface covering with an obtained oxide. This was followed by sealing, with the aluminum kept submerged in the boiling water for 30 minutes. The aluminum was then coated with the paint of a polyvinyl chloride type on the surface-treated side, with a resultant bonding strength of the resin coating (about $15\mu$ thick) of 2.4kg/25 mm which was determined by a peeling test. This strength is nearly equal to that of a paint coating on a surface of aluminum treated only with hydrochloric acid for surface etching.

The resin-coated aluminum was then tested for wear resistance of the coating resin with a 30mm wide wooden spatula which, for the purpose of testing, was repeatedly exercised 2,000 rubbings with a load of 300 gr. The result was that the aluminum surface-treated with hydrochloric acid only was coated with a resin having a peeling strength reduced to 1.3kg/25mm, while another aluminum specimen covered with aluminum oxide suffered only a negligible drop of the peeling strength of coating resin, and maintained a level of 2.2 kg/25mm.

EXAMPLE XIV

A 52S aluminum alloy plate was first submerged in an aqueous solution of 15 percent hydrochloric acid for a continuous period of 5 minutes for surface etching, and then transferred into an aqueous solution of 5 percent oxalic acid at a temperature not exceeding 40° C for a continuous dipping of 30 minutes for anodizing, applying a.c. 20 – 30 volts, in order to produce an anodized oxide on the surface. The aluminum alloy so pre-treated was then put in boiling water for a period of 30 minutes for sealing, and thereafter coated with the paint of a polyvinyl chloride on the treated surface thereof. The bonding strength of the resin coating (about $20\mu$ thick) was found to be 2.2 kg/25mm under the peeling test, which is substantially equal to that of a coating produced by applying a paint coating to an aluminum alloy, treated in an aqueous solution of hydrochloric acid for etching.

This aluminum alloy plate was tested for wear resistance of the resin coating by applying 2,000 rubbings with a load of 300 gr with a 30mm wide wooden spatula. Results of this testing were such that the aluminum alloy plate pre-treated only in the aqueous solution of hydrochloric acid suffered from a decrease of the peeling strength of the coating resin down to 1.2kg/25mm after testing, while that of another aluminum alloy, having been pre-treated with aluminum surface oxidation, suffered a negligible decrease of the peeling strength down to 2.0kg/25mm, showing a great improvement with respect to the stability of bonding strength.

EXAMPLE XV

A 99 percent aluminum plate was first anodically etched in the 4 percent aqueous solution of potassium chloride with a d.c. quantity of electricity of 20 coulomb/cm$^2$ applied, and then anodized by submerging it in 5 percent aqueous solution of oxalic acid at a temperature below 30° C, and applying an a.c. voltage of 40 – 60V for a continuous period of 20 minutes and subsequently treating for sealing in boiling water for 30 minutes, with the result of a yellowish brown surface oxide coating.

The surface of the 99 percent aluminum plate so pre-treated was coated with an aqueous dispersion of P.T.F.E. The coating so obtained was then dried and sintered at a temperature of approximately 350° C to establish a resin coating. The bonding strength of the resin coating (about $20\mu$ thick) was found to be about 2.8kg/25mm by the peeling test, which is a little larger than 2.5kg/25mm, namely the peeling strength of a resin coating of a similar aluminum object not pre-treated in the oxalic acid. Then, the resin coating of the aluminum was tested for wear resistance by applying a mechanical load of 500 gr at a temperature of 150° C with a 3cm wide wooden spatula at the speed of 150 rubbings per minute for a total of 22,000 rubbings. The result was that the aluminum which was not pre-treated in the oxalic acid showed a change of pattern of the fine surface irregularities and a numerous pinhole cavities of the base metal of aluminum due to surface removal of the surface cavities and a decrease in peeling strength down to 1.3kg/25mm. Another aluminum specimen pre-treated in the oxalic acid showed no change whatsoever with respect to the observed appearance and was found to be favored by a very high stability of bonding strength of 2.5kg/25mm with barely any unacceptable drop thereof after testing.

EXAMPLE XVI

A 99 percent aluminum plate was kept submerged in a 4 percent aqueous solution of potassium chloride and anodically etched therein by applying a quantity of electricity of 20 coulomb/cm$^2$, and then transferred into a 5 percent aqueous solution of sulfuric acid wherein the aluminum was anodized at a temperature below 30° C in a 5 percent aqueous solution of sulfuric acid with an applied d.c. voltage of 15 – 30V for a continuous period of 30 minutes. The surface of the aluminum specimen so pre-treated was then coated with F.E.P. resin in a state of aqueous dispersion, dried and then sintered at a temperature of 350° C. The resin coating so obtained (about $20\mu$ thick) was found to have a peeling strength of 2.9kg/25mm, which is a little greater than 2.7kg/25mm, a peeling strength of another aluminum plate not pre-treated by application of anodizing in an aqueous solution of sulfuric acid.

The resin coating obtained in accordance with the above-mentioned process was tested for wear resistance as described in the preceding Example XV, with the obtained result that the aluminum not anodized for pre-treatment was found to be smooth with the fine surface irregularities and numerous pinhole cavities having been removed and with a peeling strength which dropped down to 1.3kg/25mm. Another aluminum subjected to extra submerged anodizing in the aqueous solution of sulfuric acid showed hardly any change of surface appearance and maintained a peeling strength of the resin coating of 2.7kg/25mm which means that substantially no drop thereof occurred after testing.

EXAMPLE XVII

Resin-coated 99 percent aluminum plates anodized and unanodized in the Examples XV and XVI, were dipped in a 3 percent aqueous solution of sodium chloride, with the result that both aluminums which were not anodized were found to have rusted locally on the etched surface of the base metal, after only about 50 hours continuous immersion, while the other aluminums which were anodized for pre-treatment were found to be rusted nowhere on the etched surface even after continued immersion for a period as long as 500 hours.

EXAMPLE XVIII

A 99 percent aluminum plate was first anodically etched in a 4 percent aqueous solution of potassium chloride by applying a quantity of electricity of 20 coulomb/cm$^2$ of d.c., then oxidized chemically in an aqueous solution, a mixture solution of 2 percent of sodium carbonate and 0.1 percent of potassium dichromate at a temperature of 90° C for a continuous period of 10 minutes. The aluminum plate so pre-treated on the surface thereof was coated with P.T.F.E. in the state of an aqueous dispersion, which was then dried and sintered with a resin coating of about 25$\mu$ thick being obtained. The peeling strength of the resin coating was found to be 2.8kg/25mm, nearly equal to that of the resin coating of another aluminum not pre-treated chemically on the surface thereof.

The same aluminum plate as surface coated was tested for wear resistance of the resin coating thereof as in the preceding Example XV, with an obtained result that the aluminum not chemically pre-tested on the surface thereof showed a change of surface pattern and a drop down to 1.3kg/25mm of the peeling strength of the resin coating thereof after testing. Another aluminum pre-treated chemically on the surface thereof was found to have barely suffered from any drop of the peeling strength after testing. The latter aluminum plate, chemically surface-treated, also showed no corrosion on the etched surface of the base metal even after immersion thereof in a 3 percent aqueous solution of sodium chloride for a continuous period as long as 500 hours.

EXAMPLE XVIV

A 99 percent aluminum plate was kept submerged in a 15 percent aqueous solution of hydrochloric acid for surface etching for a continuous period of 7 minutes, and then exposed, for 15 minutes, to a 3kg/cm$^2$ steam bath on the etched surface thereof. The etched surface was then coated with an aqueous dispersion of P.T.F.E., dried and finally sintered at a temperature of 350° C, thus obtaining a resin coating having a thickness of about 20$\mu$. The aluminum so surface-coated was put in a 3 percent aqueous solution of sodium chloride, wherein it was then kept immersed for a continuous period of 500 hours, with the result that the aluminum which was not exposed to the steam for pre-treatment suffered from surface rusting after immersion of only about 50 hours, while another aluminum exposed to the steam showed no rusting after immersion of only about 50 hours, while another aluminum exposed to the steam showed no rusting on the etched surface thereof, after a long period of immersion which was continued for 500 hours. It should, however, be noted that the latter aluminum was not found to be favored by an appreciable improvement with respect to the wear resistance as was the case in the previous example, except for the applied load in the lower region.

For the embodiment of the invention, any acceptable chemical may be used for anodizing, if it can contribute to the production of the oxide film on the surface of the base metal or aluminum when anodizing is performed with either or both a.c. and d.c. currents, and anodizing may be accomplished at a bath temperature from 0° to 50° C. However, this temperature should preferably be kept below 40° C or even more preferably below 30° C, in order to be assured an increase in hardness of the resultant oxide film.

Optimum current density for success of surface treatment depends on the desired surface irregularities and pinhole cavities to be produced by the electro-chemical pre-treatment of the base metal or aluminum. Unless the current density is raised in approximate proportion to the increase of surface area resulting from the developed surface irregularities and pinhole cavities, only elution of aluminum occurs, without establishment of the wanted film of aluminum oxide. For example, with the developed surface irregularities and pinhole cavities described in the preceding Example XVIII, the oxide film can be established with a current density of above 5 A/dm$^2$ with successful anodizing applied to the aluminum immersed in a 5 percent aqueous solution of oxalic acid at a temperature below 30° C with a.c. current applied. Such current density is more than 10 times as large as that required for anodizing the utterly smooth surface. The time required to complete anodizing varies according to the concentration of the anodizing solution as well as the current density and for successfully anodizing the aluminum surface pre-treated with respect to the surface irregularities and pinhole cavities in accordance with the preceding Example XVIII in a 5 percent aqueous solution of oxalic acid, a current density of 5 A/dm$^2$ is required to be applied with an anodizing time in excess of 5 minutes. Preferably it should be over 15 minutes.

Also for coating the aluminum surface with the oxide in accordance with the chemical process, any type of chemical and method of treatment is acceptable if it can assure the development of the aluminum oxide film; for example, sodium carbonate, potassium chromate and potassium dichromate may be used as a mixture of their solutions.

Practice of coating the resin on the surface of an aluminum specimen, after pre-treatment of the fine surface irregularities and numerous pinhole cavities exposed to the heated water having a temperature above 85° C or steam, greatly contributes to a rise of corrosion resistance of the resin-coated aluminum or aluminum alloy. For example, being coated with about 20$\mu$ thick P.T.F.E. on the surface irregularities and pinhole cavities thereof, the aluminum, pre-treated in the 3kg/cm$^2$ steam, never suffered from surface corrosion even after immersion thereof in a 3 percent aqueous solution of sodium chloride continued for a period of as long as 500 hours. However, good surface wear resistance cannot be expected to increase as much as the corrosion resistance from application of the oxide by exposure of the base metal, or aluminum, to the heated water or the steam. This is presumably because the aluminum oxide film established by exposure of the aluminum surface to the hot water or the steam is appreciably less thick than that caused by the anodizing process.

The method of coating the pre-treated surface of the aluminum with the resin may be accomplished by application of the resin in the state of a solution, dispersion or suspension, pressurized application of a melted thermoplastic resin, application of an uncured thermosetting plastic resin and others or the combination of these different applications. The method of applying the coating resin to the pre-treated surface of the aluminum may be by spraying, roller coating, flow coating, dipping, brushing and the like.

Advantages of the invention may further be described as follows:

1. It may be reasonably concluded that the film of hard and highly corrosion resistive aluminum oxide is produced on the fine surface irregularities and numerous pinhole cavities in the surface of base metal, or aluminum, providing a firm bonding and resultantly becoming very strong in itself, and provides a bonding which withstands the mechanical load or shearing effort applied to the clinging resin coating from outside. This contributes greatly to enhance the apparent hardness of the resin coating itself, because of penetration of the surface irregularity of the coating of the aluminum oxide into the thin film of coating resin, thus enabling to establish the high wear resistance, load bearing capacity and corrosion resistance.

2. A flat aluminum or aluminum alloy surface which has been oxided is disfavored because of difficulty in fabrication by forming, as the strain or deformation causes a large tendency for cracking of the aluminum oxide film. However, the surface-etched aluminum or aluminum alloy has a certain degree of tolerance for successful forming or similar fabrication accompanied by a certain magnitude of deformation or strain. This advantage seems to be attributable to the fact that the actual area of the etched surface of the aluminum is greatly expanded by the small surface irregularities and numerous pinhole cavities in the surface thereof caused by etching. This result assures a reduced deformation or strain on the actual surface in relation to the apparent deformation or strain which makes it quite resistant to continuous cracking of the aluminum oxide produced on the etched surface of the aluminum or aluminum alloy used as the base metal.

3. Colored resin coatings can be established on the pretreated surface of the aluminum or the aluminum alloy, the base metal, without need for addition of pigment to the resin, if the surface irregularities and pinhole cavities on the base metal are established by anodic etching pretreatment, followed by anodizing and then coloring of the oxidized surface and sealing, resulting in a firm trapping of the pigment in the oxidated aluminum surface. the 4. Anodizing performed by employing a suitable organic acid such as oxalic acid, sulfo-salicylic acid or the like, imparts the colored aluminum oxide film to the surface irregularities and pinhole cavities by so called coloring anodizing, which permits the thereon overlaid transparent resin coating to show the same color as the base metal without addition of the pigment to the resin. It is, however, to be noted that color tone of the resin coating is a little darker to he eye than that of the flat base metal because of the presence of the surface irregularities and pinhole cavities in the actual surface of said metal, aluminum or aluminum alloy.

5. In the instance that the coating resin is a fluorocarbon resin, for example, P.T.F.E., the conventional method of coating the aluminum is accompanied by color tone appearance irregularity over the entire surface of the resin-coated aluminum which results from negligence in protecting the resin-coated portion of the aluminum surface at the time of anodizing in order to realize an adequate corrosion resistance (for example, by use of packing or the like) which occurs because of the undesirable reactions taking place on the etched surface of aluminum or aluminum alloy. A reaction occurring through pinholes in the coating is liable to appear in the form of a thin layer under the resin coating when the resin coating is applied directly to the surface of the aluminum or aluminum alloy without previous oxidation. The invention is advantageous in that this type of difficulty is eliminated in such a manner that the surface of the base metal, previously etched during the pre-treatment, is first oxidized chemically or electro-chemically thus enabling the anodizing of the portion of the aluminum surface, or the base metal, not covered with the resin, without need for protecting the surface to be resin coated.

Based on the above-mentioned principles, the present invention may be used with the greatest advantage to make all types of products made of resin-coated aluminum or aluminum alloy, namely resin-coated plates, resin-coated rods, resin-coated containers and all others, and in particular those having less than a $50\mu$ thick film of resin coating. Application of the invention may be made without any difficulty to a product having a resin coating to be applied thereto of $50\mu$ in thickness. In case the surface coating resin pursuant to the present invention is particularly of the fluorocarbon type, the product having the surface resin coating of this type is presently expected to be used most often for kitchen utensils because of the bearing resistance, in view of an excellent heat resistance, corrosion resistance and non-stickiness and low friction resistance. The kitchen utensils made of the aluminum or aluminum alloy surface-treated according to the present invention can avoid the surface damage caused by spatulas or spoons, and is free from the difficulty of poor mechanical strength which is presently known as one of the inherent shortcomings of the conventional kitchen utensils surface-coated with a fluorocarbon resin.

It is needless to say that the article of the present invention offers the largest practical usefullness in the making of bearings for which high wear resistance and load bearing capacity are the highest requirements.

The third embodiment of the invention relates generally to a method of improving the quality of the fluorocarbon resin coatings of the aluminum or an aluminum alloy, and more particularly to a method of drastically improving the oil resistance, stainproofness, corrosion resistance and fabricatability of the surface coating of the fluorocarbon type bonded to the aluminum or aluminum alloy, the base metal, which has previously been etched on the surface thereof for pre-treatment. As is known, a fluorocarbon resin is favored by having the largest heat resistance, corrosion resistance and electric insulation properties among all types of plastics as well as by having an excelent anti-stickiness and low frictional coefficient which are of interest from the standpoint of physical properties.

The resin coating of the fluorocarbon type applied to the surface of aluminum or an aluminum alloy incorporates the valuable properties of the fluorocarbon, and has recently drawn a keen interest for use in the making of unsticking kitchen utensils and is enjoying quick expansion of uses, including the making of oilless bearings, availing its unusually low frictional coefficient.

As may be readily surmised from the above description in that the fluorocarbon resin is unusually excellent with respect to the anti-stickiness, it is a type of resin for which adequate bonding is difficult. Various methods of bonding this type of resin have heretofore been developed after continued research by many specialists, but presently only two of them are enforced industrially for commercial production; one is called the primer process and the other is known as the etching process. The most popular types of the fluorocarbon resins are P.T.F.E., F.E.P. resin, polytrifluorochloro ethylene resin and the like, but for the purpose of their application as a coating, they must be applied in the form of a so-called dispersion representing their dispersion or suspension in water or an organic solvent which may be of fine particles, because there is no suitable solvent wherein they can be dissolved.

As already described, according to the primer method, chromic acid, phosphoric acid, sulfuric acid or the like is added to the dispersion of the fluorocarbon resin to afford the property of bonding to the metal surface, to prepare the so-called primer, which is then applied for coating the surface of the base metal, dried and finally sintered to realize sufficient bonding of the coating resin to the metal surface. For finish coating, the dispersion of the fluorocarbon resin is applied over said primer coating.

On the other hand, according to the etching process, the fine surface irregularities and numerous pinhole cavities are produced by etching the surface of the base metal of aluminum or an aluminum alloy, as already mentioned hereinbefore, through the surface treatment in an aqueous solution of hydrochloric acid or the like, or through an electro-chemical process such as anodic etching to be performed by applying a d.c. current in the electrolytic aqueous solution containing a chloride (in this regard, disclosure has already been made hereinbefore for example, as a first embodiment) and others. Then the dispersion of the fluorocarbon resin is applied to the etched surface of the base metal through any one or more of the following methods: spraying, roller-coating, flow coating, dipping, brushing or others. It is then dried and subsequently sintered to cause a firm arrest of the applied resin by the fine surface irregularities and numerous pinhole cavities wherein the resin penetrates deep enough and in turn provides a large bonding between the coating resin and the base metal.

From the above, it may be reasonably said that the primer method refers to a chemical bonding, while the etching method concerns itself with the mechanical bonding.

Advantages and disadvantages of these two methods of resin coating are as follows:

As to the primer method, the bonding strength of the fluorocarbon resin coating is appreciably reduced when the coating has been exposed to the heated water or oil; this type of difficulty offers a substantial problem for application of resin-coated kitchen utensils. For example, when the resin coating is dipped in a boiling water bath, the bonding strength and the scratch resistance show an appreciable drop down to about 40 – 60 percent of the same before exposure to the boiling water by immersion for a period below five hours. Immersion of the same coating in an edible oil heated up to a temperature of 200° C to 250° C gives rise to a large decrease of the bonding strength even in a very short time of immersion of about 3 hours as compared to a corresponding level of 5 hours immersion in the boiling water. Because of the chromic acid content, the primer as coated on the surface of the metal exhibits a dark color, which means a color as seen through the pure overlaying layer of fluorocarbon resin alone is not true because this type of resin is characteristically clear and transparent. For this reason, it is a usual practice to add a suitable filler such as a pigment to the finished resin coating to be applied to the surface of the kitchen utensils, in order to conceal the color of the surface coating of the base metal, or the aluminum or aluminum alloy. It should, however, be noted that this practice of surface coating is always accompanied by a difficulty that non-stickiness of the resin coating tends to make a gradual decrease in the course of continued service of the kitchen utensil when surface-coated pursuant to the technique described, presumably because of inclusion of the foreign matter other than the fluorocarbon resin.

Referring to the etching method, the fluorocarbon resin coating is less liable to suffer from a decrease in bonding strength caused by exposure thereof to the boiling water or the heated oil previously described, presumably because of the greater mechanical arrest of the coating on the surface of the base metal than that established pursuant to the primer method. It offers an additional advantage in that the non-stickiness of the resin coating is more reluctant to reduction than the coating provided by the primer method when the coating has been applied to the kitchen utensil use, because only the fluorocarbon resin may be used for coating without need for addition of a filler, such as pigment or the like, as no primer is necessitated. From this, it may be deduced that the etching method may be ranked superior to the primer method.

The etching method, however, as yet has an inherent disadvantage with respect to the applied fluorocarbon resin coating which can hardly be said to be perfect, despite application thereof according to the etching method.

The bonding strength of the resin coating realized through the etching method is not as great as that possible through the primer method, and is subject to bonding strength decrease due to aging caused by immersion in the boiling water or the heated oil, when continued for a period less than 5 hours; but these properties drop down to the 80 to 90 percent level after immersion is continued over 20 hours. This tendency of reduction of these properties is true also for the resin coating applied in accordance with the primer method, but is aggravated when the resin-coated base metal, or aluminum or aluminum alloy, is bent or stretched. Use of a kitchen utensil exposed to heated oil, for example a frying pan, continued for a long period, tends to cause a change of the resin coating color to a light or dark brown. The probable cause of the above-mentioned difficulties is the fact that although the bonding strength of the resin coating is due to mechanical arrest of the coating resin by the fine surface irregularities and numerous sharp pinhole cavities in the surface of the base metal, or aluminum wherein said resin penetrates, the resin can, in fact, not penetrate into all of the surface irregularities and pinhole cavities to the full depth and down to the bottom, leaving therein a small air gap in the surface cavity which the oil then fills up after penetration through the film of resin coating. This leads to a drop of the bonding strength with a change of surface color taking place after a prolonged period of service of the product, such as a kitchen utensil, which is perhaps due to the carbonization of oil filling up the cavities caused by heating. Mechanical bonding and stretching of the resin-coated aluminum seems to give rise to the expansion of the air gap in the cavity in the surface of the base metal, or aluminum, which in turn results in an increase of the permeability accordingly and aggravation of the bonding strength due to immersion in the heated oil.

Both the primer method and the etching method have common difficulties in that the aluminum, pre-treated and surface-coated in accordance with either of said two methods, is corroded after immersion thereof in a aqueous solution of sodium chloride for a prolonged period. This is caused by corrosive matter penetrating through the coating resin film which causes irregular coloring of the resin-coated surface thereby reducing its attractive appearance unless suitable protection is provided for the coated portion of the surface of the base metal. These difficulties seem to be attributable to the failure of the pinhole cavities in the film of the coated fluorocarbon to be filled up, even after heating thereof up to a temperature above the characteristic melting point thereof. This results because the thickness of the film is generally as small as $20\mu - 30\mu$ for the kitchen utensil and the resin of a fluorocarbon type shows in sufficient fluidity even after achievement of a temperature above its characteristic melting point, due to an extremely high characteristic fusion-viscosity.

The present invention enables one to eliminate all types of difficulties found in the resin-coated aluminum treated pursuant to the conventional etching methods, and resultantly provides an aluminum product coated with a fluorocarbon resin and which has a very excellent quality. The method of the present invention is characterized in that the aluminum or aluminum alloy is first etched on the surface thereof to provide the fine surface irregularities and numerous pinhole cavities in the surface of said base metal, and then coated with the dispersion of the fluorocarbon resin directly on the etched surface, or the prepared surface may be first oxidized by electro-chemicals or by chemically oxidizing the surface irregularities thereof, in order to establish thereon the coating film of aluminum oxide. This is followed by coating with a dispersion of the fluorocarbon and subsequent heating of the coated surface in boiling water of steam. Namely, the present invention provides a new method of coating the surface of an aluminum or aluminum alloy object with a resin of the fluorocarbon type whereby etching is first applied to the surface of the base metal, namely aluminum or aluminum alloy, to insure improved anchorage to arrest and anchor the coating resin on the metal surface. This etching includes all types of etching methods which may be a chemical method of etching with, for example, an aqueous solution of hydrochloric acid or an electro-chemical method of etching with, for example, anodic etching applying d.c. current to the base metal of aluminum or aluminum alloy which is immersed in the electrolyte containing a chloride, as previously taught herein, or more specifically by way of example, the chemical method of etching which resorts to immersion of the aluminum or aluminum alloy in a 15 percent aqueous solution of hydrochloric acid for a continuous period of 5 to 10 minutes and an electro-chemical method of etching resorting to anodic etching of aluminum or aluminum alloy immersed in a 2 percent aqueous solution of ammonium chloride with a d.c. current density of $10A/dm^2$ for a continuous period of 3 minutes.

In the instance where an especially large amount of wear resistance, compressive strength and corrosion resistance of the resin coating are the primary requirements of an aluminum or aluminum alloy product to be coated with the resin, the preferable method, for the purpose of embodying the invention, is the method of anodizing the etched surface of the aluminum or the aluminum alloy wherein it is kept immersed in, for example, a 5 percent aqueous solution of the oxalic acid maintained at a temperature below 30° C and an a.c. voltage of 30 – 60V is applied for a continuous period of 30 minutes. Secondly, the chemical method of oxidizing the etched surface of the aluminum or the aluminum alloy may be incorporated whereby the treated surface is kept immersed in, for example, an aqueous solution of 2 percent sodium carbonate and 0.1 percent potassium bichromate at a temperature of 90° C for a continuous period of 20 minutes; and thirdly, other suitable methods may be incorporated which are suitable to establish the coating film of aluminum oxide. It is, however, to be noted that for an ordinary application of the surface-coated aluminum or an aluminum alloy product such as for kitchen utensils or the like, direct coating of the etched surface of the aluminum or aluminum alloy with the resin film is sufficient to meet the requirement for that type of product. With respect to the resin coating, a fluorocarbon resin, which is excellent in regard to chemical resistance, is applied in the state of a liquid containing the suspended particles thereof, because there is no solvent for this type of resin. Of the fluorocarbon resins, P.T.F.E. is applied for coating generally in the state of aqueous dispersion, and F.E.P. resin is applied in a state of aqueous dispersion in water of an organic solvent. Different methods of applying the described resins are known. Any one of spraying coating, roller-coating, dip coating, flow coating, brushing and others may be employed to suit a particular application of resin coating, depending on the shape and quantity of the aluminum or aluminum alloy product to be resin coated and other factors of the coating operation. Application of the resin in a dispersion state for coating is, according to the invention, followed by a small amount of heating of the resin-coated aluminum or aluminum alloy product to achieve drying by virtue of evaporation of the water content or organic solvent contained therein, and subsequent heating, in the case of P.T.F.E., up to a temperature of 350° to 400° C; or in the case of F.E.P. resin, up to a temperature of about 330° to 380° C to realize fusion of the resin for obtaining the continuous and integral resin coating. This last process is usually called sintering.

The method of heating the resin-coated aluminum and aluminum alloy in the atmosphere of heated water or steam, according to the present invention, is executed specifically by heating the object in the atmosphere containing the steam or in hot water heated up to a temperature above 85° C. To be successful, these types of heating methods do not require absolute purity of the water or the steam but tolerate the co-existence therein of other substance or matter. Heating in the atmosphere with steam may be done successfully even when the air or even ammonium gas or the like is co-existing in the steam. Co-existence of a salt in the heated water is unobjectionable to achieve the success of heated air processing previously described.

More specifically, the heating of the water must be sufficient to heat the resin-coated aluminum or aluminum alloy up to above approximately 80° C, and preferably near the boiling point or at a temperature which causes the water to boil with the resin surface immersed therein.

For specific example, exposure of the aluminum or aluminum alloy coated with the P.T.F.E. having a thickness thereof in the order of less than about 20μ to boiling water, wherein it has been immersed, gives rise first to a change of quality of the resin coating after about 20 minutes, at which the reluctance of the bonding strength of the resin coating to drop due to probable exposure to heated oil and appearance and resistance to corrosion due to contact of coating with the salt is observed. Despite the anodizing effected on the exposed portion of the surface of coated aluminum or aluminum alloy, for example, the not-resin-coated side thereof, without any protection of the resin-coated portion of the surface, immersion in the boiling water for a continuous period in excess of 30 minutes removes the difficulty of occurrence of irregular coloring of the resin coated surface because the possibility of the growth of a local reaction through the pinholes in the resin coating is precluded.

In order to assure improvement in oil resistance, stainproofness and corrosion resistance of the resin-coated surface of the aluminum or aluminum alloy, immersion is desirably continued for a period longer than 1 hour.

The aluminum or aluminum alloy which has been heat treated in the hot water or the steam according to the method and practice previously described herein suffers from no change of strength of the bonding of the coating resin to the base metal of aluminum or aluminum alloy even after immersion for heating in an edible oil at a temperature of 200° to 250° C for a period exceeding 50 hours. Contrarily, the aluminum or aluminum alloy, not heat treated, shows a drop in the bonding strength down to the 80 – 90 percent level before immersion in the heated edible oil, as can be confirmed also by the peeling test or scratch test wherein a steel needle point is applied to scratch the resin coating to find the critical load causing the initial break of the coating film. The resin coating, the quality of which has been improved as described above by virtue of heating performed while immersed in the boiling water or exposed to the steam, is free from the problem of damage of the coating resin film even after a service continued for a prolonged period and it enjoys a very long service life when it is used as a material in, for example, a frying pan. The resin coated aluminum or aluminum alloy, not heat treated pursuant to the above practice of treatment, suffers from such difficulties such that when it is immersed or exposed to the heated oil, fine air gaps occur between the resin coating and the etched surface of base metal, namely aluminum or aluminum alloy, which are locally filled with the oil penetrating through the coating film of resin. This results in an appearance of irregular color pattern in the coating resin or the staining of the entire coating. Such a resin coating tends to change color into a yellowish brown when it is then heated in the air for a continuous prolonged period, presumably because of the partial or local carbonization of the entrapped oil. This type of difficulty can be precluded by use of the present invention on the resin-coated aluminum or aluminum alloy to the extent that hardly any change of surface color becomes visible by virtue of an applied heating treatment as already described. This means that the aluminum or aluminum alloy is, when used as a material in a kitchen utensil, assured of lasting surface beauty which means great enhancement of the value of the product for practical use.

The water to be used for the surface treatment described hereinabove may be city water or well water as well as an aqueous solution. However this is liable to cause blackening of the portion of the surface of aluminum or aluminum alloy which is not coated with the resin. Where local blackening of the surface is to be avoided, it is preferable that ion-exchanged water, distilled water or a similar fluid be employed in place of the described aqueous solution for immersion of the surface-coated aluminum or aluminum alloy for heat treatment.

Use of the steam contributes to extra reduction of the time required to complete the quality improving heat treatment. Being described more specifically by way of example, the aluminum or aluminum alloy is first etched on the surface thereof, coated with an aqueous dispersion of P.T.F.E., dried, sintered at a temperature above 327° C and finally heated by exposure to steam. The time required to obtain the same effect of said heating treatment as that carried out in boiling water is only over 20 minutes or preferably over 1 hour, with applied steam of 1kg/cm², which is subject to change depending on the pressure of the steam. With this heating treatment applied, the oil resisting property and corrosion resistance of the resin-coated aluminum or aluminum alloy can be increased noticeably and the resin-coated aluminum or aluminum alloy is capable of being anodized, or the non-resin-coated surface thereof may be obtained, without need for performing a surface pre-treatment. With 3kg/cm² of steam applied, the effect of the heating treatment can be obtained by heating continuously for a period longer than 5 minutes or exposure to steam is continued preferably for a period over 15 minutes to be assured of the same effect of the heating treatment as mentioned above. A higher steam pressure contributes to a reduction of time required for said heating treatment accordingly. Addition of a volatile substance, for example, ammonium gas, to the heating steam is another factor which helps to obtain a good result as required. Surface heating may also be accomplished by placing the resin-coated aluminum or aluminum alloy in a furnace wherein the temperature is held above 100° C, for example, 200° C, and the steam is discharged therein. The reasoning behind the effectiveness of the heating treatment previously mentioned as obtained by exposure of the resin-coated aluminum or aluminum alloy to the hot water or steam atmosphere may be as follows: the hot water or steam is allowed to penetrate through the film of the fluorocarbon resin to the etched surface of the base metal, namely aluminum or aluminum alloy, and seems to react to change the surface into the hydrate of aluminum oxide (probably, $Al_2O_3 \cdot H_2O$). The excellent performance of the aluminum or aluminum product, resin-coated and heated with the hot water or steam, is presumably attributable to the growth of this reaction product of aluminum oxide which securely tightens the coating resin mechanically arrested by the fine surface irregularities and pinhole cavities and fills up the air gaps left unfilled. When the etched surface of the aluminum or aluminum alloy has been oxidized by anodizing, chemical oxidation or other means, the film of the produced aluminum oxide becomes appreciably thick, covering the etched surface, and should the hot water or steam be applied to the etched surface and thereafter resin-coated, the film of the aluminum oxide is presumably changed into $Al_2O_3 \cdot H_2O$ because of the reaction thereof with the water. Volumetric expansion of the aluminum oxide resulting from reactional production due to exposure to the heated water or the steam is larger than that of etched surface of the base metal covered directly with the resin, thus presumably providing an effect of quality improvement by resin coating larger than that obtained as mentioned previously.

For the reason described hereinabove, penetration of the heated oil through the coating resin, if any, may perhaps be reluctant to occur resulting in the successful prevention of a decrease in the bonding strength of the resin coating. It is also reasonably presumed that with the resin coating of an aluminum or aluminum alloy surface treated as above for making a kitchen utensil, change of the surface color into a yellowish brown, due to the thermal decomposition of the edible oil penetrating through the resin coating, is reluctant to take place because the oil is also reluctant to penetrate through the coating resin into the air gaps between the etched surface of the base metal, namely aluminum or aluminum alloy, and the resin coating. The hydrate of the aluminum oxide which seems to be produced on the surface (etched) of the base metal, which is a result of the heating treatment with the heated water or the steam, indicates an excellent corrosion resistance so that it reduces the tendency of the base metal to be corroded by sodium chloride or the like penetrating through the resin coating, when anodizing is applied thereto, for example. A non-resin-coated side of the base metal, namely aluminum or aluminum alloy, causes very little of any local color change of the resin-coated surface of the metal due to the presence of the pinholes in the resin coating, without need for special protection to be taken.

Resin coating of the etched surface of the aluminum or aluminum alloy oxidized by anodizing, chemically oxidizing or by a similar method to establish thereon the film of oxide, is favored by the improvement of performance with respect to not only the above description, but also the wear resistance, compressive strength and especially the corrosion resistance after application of the treatment in the heated water or steam because of the comparatively thick coating of aluminum oxide which is hard and corrosion resistive.

Heat treating in the heated water or steam after etching the base metal and coating it with the fluorocarbon resin in the state of dispersion which is thereafter dried or melted at a temperature above the melting point and finally sintered, is to afford a chemical reaction on the etched surface as mentioned above which is caused by the penetration of the applied heated water of steam through the resin coating film, so that the optimum treating condition may vary depending on the type and thickness of the resin coating applied.

For the purpose of application in making the fluorocarbon type resin coating of the aluminum or aluminum alloy according to the present invention, there can be different method embodiments of the same invention as disclosed hereunder. These depend upon the method step location of applying the heated water or the steam in the course of the total process of resin coating. In a first case, the base metal, namely the aluminum and the aluminum alloy, is etched on the surface thereof pursuant to a chemical or electro-chemical process, and then coated with the fluorocarbon resin in the state of a dispersion, or coated with the film of the aluminum oxide produced through anodizing, chemical oxidation or other means for oxidation of the etched surface, and then coated with the coating resin of the fluorocarbon type which penetrates into and is arrested firmly by the fine surface irregularities and numerous pinhole cavities in the surface of the base metal caused by etching. It is then heat treated by exposure to the heated water of steam. This embodiment of the present invention may be broken down into the following three method sequences according to the timing of the heat treatment. The resin coating process is composed of three stages, namely coating, drying and sintering. The heat treatment may be made between drying and sintering, at the time of sintering or after sintering and it ensures an excellent resin coating having an improved stability of bonding strength, resistance against attack of oil, stainproofness against oil and corrosion resistance and a reluctance to the occurrence of color irregularities on the surface due to anodizing of the exposed metal surface, as already described.

If the heat treatment is carried out in the heated water or steam before or concurrently with the sintering step while the resin coating still has a comparatively low mechanical strength, the coating is liable to be damaged if special caution is not observed. For this reason, the heating treatment in the heated water or steam should preferably be done after sintering. The heat treatment conducted after sintering of the resin coating may be classified into three instances as follows:

First is the case where the resin-coated aluminum or aluminum alloy is to be formed or otherwise fabricated at a later time, for example, the resin-coated aluminum or aluminum alloy plate is fabricated into a frying pan, pot, scallop, cauldron, kettle or the like by pressing, spinning or any other appropriate machining method. But it is to be noted that there may be a case in which the forming or fabrication is otherwise not made if the aluminum or aluminum alloy resin coated in accordance with the invention is used only as, for example, a flat plate or prefabricated product. There are three different methods of applying the heating treatment. Depending on the timing of the treatment, namely before, concurrently with or after forming or fabrication; these three may be exercised at different times or at the same time, according to the type of forming, fabrication or machining to be applied, the magnitude of anticipated mechanical deformation of the resin-coated plate to obtain a product consisting of a frying pan, kettle or similar article by pressing or other methods. The obtained product is more excellent than one not subjected to said heating treatment with respect to the stability of bonding strength against the attack of oil. The performance is high in reluctance to staining due to oil and heat, corrosion resistance against sodium chloride, for example a 3 percent aqueous solution of salt sodium chloride, and capability of being anodized. The performance of the product resin coated pursuant to the present invention and then thereafter formed to shape is especially excellent, when the deformation or strain of the resin-coated aluminum or aluminum alloy is not large (for example, in the order of about 6mm as expressed in terms Erichsen value), and pressing is done, for example, after said heating treatment by applying 3kg/cm$^2$ of steam for a continuous period of 30 minutes with a thickness of about 20$\mu$ of P.T.F.E. coating applied to the surface of the base metal, namely the aluminum or the aluminum alloy. The bonding strengths of the resin coating of both base metals, one being oxidized on the etched surface thereof before resin coating and the other having a resin coating applied directly on the etched surface thereof, show almost no decrease, and no corrosion is apparent on the resin coating even after immersion in a 3 percent aqueous solution of sodium chloride continued for as along as 500 hours on either base metal specimen.

In another example wherein the heat treatment of the resin-coated aluminum or aluminum alloy in heated water or steam was not applied, the bonding strength showed a drop of about 70 percent due to the same cause as already described in connection with a large deformation, and corrosion appeared as soon as about 30 hours after immersion in an aqueous solution of sodium chloride. The aluminum or aluminum alloy showed a small decrease in bonding strength caused by attack of heated oil and slight surface staining caused by heat and oil, and corrosion due to exposure to sodium chloride appears at a portion of the surface subjected to a specially heavy or pronounced deformation of the base plate, namely aluminum or aluminum alloy. This seems to be attributable to the fact that the resin coating is stretched or bent in accordance with the mechanical forming or fabrication thereby causing air gaps to appear between the coating resin and the surface of the base metal, wherein the oil or salty water is allowed to enter through the coating resin film with greater ease. Therefore, it may be reasonably said that the resin-coated aluminum or aluminum alloy subjected to the heating treatment for improvement of quality of the resin coating, will provide a satisfactory formed product which is made thereof, except when it is deformed excessively and the product is destined to be subject to heavy attack by heat, oil or salt.

One solution for the problem resulting from excessive forming is the application of the heating treatment in heated water or steam when the forming is being done, but this is always accompanied by various difficulties with respect to the related equipment, productivity and operating efficiency in the practical forming in the factory. The same advantageous effect may be better obtained by applying the heating treatment with heated water or steam after forming of the article. Therefore, practice of the heating treatment after forming, as described below, is preferable for the purpose of embodying the present invention. In the above mentioned heat treatment of the resin-coated aluminum or aluminum alloy in the heated water or the steam after forming, for example, heat treatment of a deep pot, having a coating of about 20$\mu$ thick P.T.F.E. over aluminum or an aluminum alloy plate, was carried out in 3kg/cm$^2$ of steam and continued for a period of 30 minutes after press forming which assures perfect freedom of the product from every possible defect and difficulty and provides an unusually excellent performance in the formed product. More specifically, the described press-formed product of the deep pot suffered from no decrease in the bonding strength of the coating resin even after attack by heated oil which was continued for a period of 20 days, and no surface staining occurred due to heating at a temperature of about 250° C which was continued for 10 hours, and no corrosion occurred due to immersion in a 3 percent aqueous solution of sodium chloride which was continued for a very long period of 500 hours. Furthermore, no other difficulty occurred resulting from the anodizing performed on the exposed surface portion of the aluminum or the aluminum alloy, without protection of any type whatsoever applied to the coated surface of the base metal. This practice of applying the heating treatment in heated water or steam after forming, will be found most advantageous when forming of the product involves heavy drawing of the metal. Namely, this practice assures the provision of a formed product made of fluorocarbon resin coated aluminum or aluminum alloy, having an excellent oil resistance, and corrosion resistance and capable of being anodized, even though it may be subjected to a very heavy mechanical deformation after the coating is applied. Practical effects inherent to this practice of the present invention will be described with reference to Example XXIV.

A specimen of aluminum or aluminum alloy coated with fluorocarbon resin was placed in an Erichsen tester, with the resin-coated side up, and pressed with the punch of a 10mm steel ball to impart a semi-sphere recess thereto. The bonding strength of the coating resin of the deformed portion of the specimen, after immersion in heated oil, was measured to find out the Erichsen value corresponding to a certain allowable limit of bonding strength. This testing was conducted to obtain definite data in view of the tendency of decrease to occur in the bonding strength of the resin coating caused by a heavy bending and elongation thereof, especially after exposure to the attack of heated oil. The Erichsen value of the tested aluminum or aluminum alloy being about 11mm (beyond which the aluminum begins to crack), the test was carried out until a 10mm deep recess was obtained.

Specimens prepared for this testing were of two types of an aluminum or aluminum alloy plate coated with P.T.F.E. with etching only applied, then anodized and finally coated with the P.T.F.E. Each of them was grouped depending on the immersion time in boiling water or steam such that specimens were provided which were not heat treated before Erichsen testing which simulates the forming, and heat treated after Erichsen testing respectively (representing after forming). In the samples which were not exposed to the boiling water or steam, a recess of 8mm is the tolerable limit before exposure to the heated oil, and a recess of no more than 3mm deep cannot assure that the bonding strength will remain above the normal level after exposure to heated oil. In the sample exposed to the boiling water or steam before forming, a recess of 10mm is acceptable, regardless of anodizing of whether the etched surface was performed before resin coating, but a recess of no more than 7mm deep is the limit for the sample not anodized and a recess of no more than 8mm is the limit for the sample which is anodized in order to have the bonding strength remain above the normal level. In other words, the results of the Erichsen testing indirectly showed that the formability is much greater for the sample which is heat treated than for the sample which is not heat treated.

For the sample exposed to boiling water or steam after the Erichsen testing, even a recess as deep as 10mm was found to allow the preservation of a satisfactory bonding strength after exposure to heated oil for all tested samples anodized on the etched surface before application of the resin coating and not anodized on the etched surface before resin coating. Considering the Erichsen value of about 11mm for the aluminum or aluminum alloy and the obtained results of the testing described hereinabove, it can be reasonably concluded that the heating treatment in the heated water or the steam, when made after forming, offers a solution for the problem of the decrease in the bonding strength caused by the forming or fabrication thereof.

The effect of the heating treatment in the heated water or the steam seems to derive from the fact that as a result of said treatment, the heated water or steam penetrates through the coating resin to react with the etched surface of the base metal, namely the aluminum or aluminum alloy, to establish the film of the aluminum oxide (probably, $Al_2O_3 \cdot H_2O$) which then grows to fill up the pinhole cavities between the surface of the base metal and in the air gaps produced by mechanical deformation of the resin coating operation and thereby forms and tightens the resin arrested by the surface fine irregularities and numerous pinhole cavities in the etched surface of the base metal.

The aluminum or the aluminum alloy, the etched surface of which has been anodized or chemically oxidized and coated with a resin, is preferably coated with an appreciably thick aluminum oxide having irregular surface so that the volumetric expansion of the etched surface of the base metal is aggrevated by the heating treatment in the heated water or steam to help enlarge the advantages of the invention already described.

As is readily understood from the above disclosure, the formed product of aluminum or an aluminum alloy, which has been subjected to the heating treatment in heated water or steam after forming, has an excellent oil resistance, stainproofness and corrosion resistance and is capable of being anodized on the exposed portion of the base metal surface, namely aluminum or aluminum alloy, with a good result, such that it can be used as any type of formed product; especially as kitchen utensils which are often exposed to heated oil which is heated to a very high temperature and maintained there and also exposed to salty water or the like.

As has been described hereinbefore, various combinations of the method steps of etching resin coating in heated water or steam may be employed. The steam heating treatment may, of course, be made at a plurality of times before obtaining the ultimate product, for example, a first heat treatment may be applied immediately after the resin coating and a second heat treatment may be applied after press-forming; this repetition of the heat treatment is, of course, within the scope of the present invention.

Hereinafter follow several examples of embodiment of the present invention, which however, in no way limit the applicable scope of the invention.

The terminology used in the description of the examples is in accordance with the special definitions as follows: Reduced bonding strength after immersion in the heated oil (RBSAIIO)

Bonding strength of the resin coating reduced after immersion of the same in an edible oil heated to about 200° C for a continuous period of 20 hours (expressed in terms of % of the original bonding strength before immersion).

STAINPROOFNESS (SP)

Stain of the surface of the resin coating as achieved after heating at a temperature of about 250° C with a gas fire and then heating by exposure to an edible oil coating said surface for a continuous period of 3 hours.

CORROSION TIME (CT)

Time required to achieve the initial corrosion of the resin coating bearing a cross-cut from a knife after immersion in a 3 percent aqueous solution of sodium chloride at room temperature.

ANODIZING (AD)

Electro-chemical oxidizing of the resin coating after electro-chemical treatment of a non-resin-coated portion of the surface in an aqueous solution of oxalic acid continued for a period of 30 minutes followed by sealing in boiling water for a continuous period of 30 minutes.

APRAISAL OF RESULT (FINDING)

◎ Very Good   ○ Good   △ Slightly Poor   √ Poor

ORIGINAL SPECIMEN

The specimen of aluminum or aluminum alloy was not heat treated in boiling water of steam.

EXAMPLE XX

A 99 percent aluminum plate was immersed in a 15 percent aqueous solution of hydrochloric acid for a continuous period for surface etching, and then coated by spraying an aqueous dispersion containing 60 percent (by weight) of P.T.F.E. The resin so coated was dried and sintered at a temperature of 350° C for a continuous period of 15 minutes to obtain a film of about $20\mu$ thickness of the coating resin. Three specimens prepared in accordance with the above procedure were tested for reduced bonding strength, after immersion in oil, antiproofness, corrosion time and anodizing, subject to preceding definition with the first not heat treated (original) and the second heat treated in boiling water for a continued period of 1 hour and a third for 3 hours. Results of the testing were as listed below:

| Treatment | RBSAIIO | SP | CT | AD |
| --- | --- | --- | --- | --- |
| Original | 82% | △ | 50 hrs. | √ |
| 1 hr. in B.W. | 92% | ◎ | 150 hrs. | ◎ |
| 3 hrs. in B.W. | 100% | ◎ | over 500 hrs. | ◎ |

(Note): B.W.=Boiling water.

EXAMPLE XXI

A 99 percent aluminum plate was immersed in a 2 percent aqueous solution of sodium chloride for a continuous period of 3 minutes with an applied d.c. current density of $15A/dm^2$ for anodic etching of the surface thereof. The etched surface was then coated with an aqueous dispersion containing 60 percent (by weight) of fluorocarbon resin pursuant to the flow coating method. The surface so coated was dried and sintered at a temperature of 350° C for a continuous period of 15 minutes to obtain about a $20\mu$ thick film of the resin coating. Various specimens prepared pursuant to the above were tested for reduced bonding strength after immersion in oil, stainproofness, corrosion time, anodizing in two groups, one for a non-heat-treated specimen (original) and another for one heat treated in steam in accordance with the same practice as in case of the preceding example, with the obtained results as shown hereunder.

| Treatment | RBSAIIO | SP | CT | AD |
| --- | --- | --- | --- | --- |
| Original | 84% | △ | 50 hrs. | √ |
| 10 min. in 1kg/cm² steam | 86% | △ | 50 hrs. | √ |
| 60 min. in 1kg/cm² steam | 92% | ○ | 400 hrs. | ◎ |
| 10 min. in 3kg/cm² steam | 92% | ○ | 330 hrs. | ◎ |
| 30 min. in 3kg/cm² | 100% | ◎ | over 500 hrs. | ◎ |
| 10 min. in 5kg/cm² steam | 94% | ◎ | 360 hrs. | ◎ |
| 30 min. 5kg/cm² | 100% | ◎ | over 500 hrs. | ◎ |
| 10 min. 10kg/cm² steam | 100% | ◎ | over 500 hrs. | ◎ |

EXAMPLE XXII

A 3S aluminum alloy plate was immersed in a 15 percent aqueous solution of hydrochloric acid for a continuous period of 10 minutes for surface etching. The etched surface was coated with an aqueous dispersion containing 50 percent (by weight) of a fluorocarbon resin, was applied pursuant to the roller-coating method and then dried. Two groups of these coated specimens was sintered at a temperature of 380° C for a continuous period of 10 minutes, one for non-heat-treated (original) specimens and another for specimens heat treated in steam. They were then tested in accordance with the same practice as in the preceding example, obtaining the result as listed below:

| Treatment | RBSAIIO | SP | CT | AD |
| --- | --- | --- | --- | --- |
| Original | 85% | △ | 50 hrs. | √ |
| 30 min. in 3kg/cm² steam | 100% | ◎ | over 500 hrs. | ◎ |
| 10 min. in 5kg/cm² steam | 98% | ◎ | 450 hrs. | ◎ |

EXAMPLE XXIII

A 99 percent aluminum plate was immersed in a 2 percent aqueous solution of ammonium chloride for a continuous period of 2 minutes with an applied current density of $20A/dm^2$ for anodic etching of the surface. Two groups of the specimens were so prepared, one for a non-heat-treated (original) specimen and another for a heat treated specimen in heated water of steam. They were coated with an aqueous dispersion containing 50 percent (by weight) of fluorocarbon resin, dried and then sintered to obtain about a $30\mu$ thick film of the resin coating, and then tested for reduced bonding strength, after immersion in heated oil, stainproofness, corrosion time and anodizing in accordance with the same practice as in the preceding example, with the obtained results as listed below:

| Treatment | RBSAIIO | SP | CT | AD |
|---|---|---|---|---|
| Original | 85% | △ | 50 hrs. | ∨ |
| 1 hr in 95° C water | 88% | ⊚ | 300 hrs. | ⊚ |
| 30 min. in 3kg/cm² steam | 86% | ⊚ | over 500 hrs. | ⊚ |

EXAMPLE XXIV

Two groups of a 99 percent aluminum plate specimen, one for a specimen surface coated with a fluorocarbon resin in accordance with the preceding Example XXI, and another for the specimen surface coated with the resin on the etched surface and then anodized in a 5 percent aqueous solution of oxalic acid (below 30° C) with an applied a.c. voltage of 30 – 50 volts for a continuous period of 30 minutes, were tested by the Erichsen method (often applied with the Erichsen tester for a bending test of a metal plate to cause a recess on the test specimen with the punch of a 10mm steel semi-sphere) to apply the bending and elongation to the test specimen with the resin coated side up, by means of 2 – 10mm punch. The resin coating of the specimen at a convex portion caused by the punch of the Erichsen tester, was then placed on the scratching tester to check the bonding strength thereof in order to find out the critical Erichsen Value (depth of recess caused by the punch) corresponding to the limit of the decrease in the bonding strength below a certain level. For the purpose of testing, the resin-coated specimens were grouped into the following three sets: the first for the specimen recessed by the Erichsen tester and nothing more, the second for the specimens recessed by the Erichsen tester and then heat treated in a 3kg/cm² steam bath for a continued period of 30 minutes and the third for the specimens heat treated in 3kg/cm² of steam and then recessed by the Erichsen tester. Each of the groups of specimens were then sub-divided into two sub-groups, one for the specimen immersed in heated oil and another for the specimen not immersed in the heated oil (200° C – 3 hrs.), to measure the bonding strength of the resin coating, in order to find the Erichsen value. Also, the test of anodizing of the non-resin-coated side of the surface of the base metal or the aluminum was carried out. Results of those testings are as summarized in the following:

ERICHSEN VALUE

| | Before imm. in oil | After imm. in oil | AD |
|---|---|---|---|
| No. 1 Group: | | | |
| Only E. recessed | 8 mm | 3 mm | ∨ |
| E.R. after H.T. in steam | Over 10 mm | 7 mm | ○ |
| H.T. after E.R. | do | Over 10 mm | ⊚ |
| No. 2 Group: | | | |
| Only E. recessed | 8 mm | 3 mm | ⊚ |
| E.R. after H.T. in steam | Over 10 mm | 8 mm | ⊚ |
| H.T. after E.E. | do | Over 10 mm | ⊚ |

It is to be noted that No. 1 Group concerns the specimens of the same resin-coated aluminum as in the case of Example XXI and No. 2 Group is related to the aluminum having its surface etched and anodized before coating of the resin.

From the preceding disclosure, it is apparent that the application of the present invention enables one to obtain an excellent fluorocarbon resin coating on the aluminum or aluminum alloy of products formed or fabricated, if necessary, which are suited for various uses. The invention may be applied in many different patterns of embodiment according to the timing order of the component treatments as is described again hereunder. The first description will be made with respect to the different method step patterns of the invention, depending on the timing of the heating treatment in the heated water or in the steam.

For the sake of simplicity, the term "heating treatment in the heated water and in the steam" will hereinafter be referred to simply as "water treatment." (1) The first method sequence embodying the present invention provides for the performance of the water treatment before forming or otherwise fabricating the structure and can be sub-divided into permissible treatment times as follows, depending on the timing of applying the resin coating:

(1–1) before sintering (FIG. 1)
(1–2) at the same time as sintering (FIG. 2)
(1–3) after sintering (FIG. 3)

In FIG. 1 to FIG. 4 in the accompanying drawing, oxidation means the production of the film of aluminum oxide on the etched surface of the aluminum or the aluminum alloy by anodizing or by applying a chemical oxidizing method as may be found necessary.

With any one of the above described three different types of resin coating, the bonding strength of the coating is improved in that it shows no decrease even after immersion of the resin coating in the heated oil for a prolonged period, presumably because the air gaps present between the etched surface of the base metal, namely the aluminum or the aluminum alloy, and the coating resin is filled up by the reaction product produced by the water treatment to be performed after resin coating, and the penetration of the heated oil through the resin coating is prevented. Thus, this enables one to make excellent kitchen utensils, for example, frying pans, which suffer little if any discoloration or staining even after a long period of use. In addition to such advantages, it is assured, of course, that a high corrosion resistance and capability of being anodized on a portion of the metal surface not resin coated is possible.

Establishment of the aluminum oxide film on the etched surface of the base metal, namely the aluminum or the aluminum alloy, by anodizing or a chemical oxidizing method, before surface coating with the resin, contributes greatly to the additional volumetric expansion of the aluminum oxide built on the etched surface resulting from the applied water treatment after resin coating which in turn not only gives rise to added improvement of the above-mentioned properties, but also provides the additional advantages of large wear resistance and compressive strength.

The method (1–1) previously described means the resin coating immediately upon application remains porous, and this is advantageous in that the time required for the water treatment can be reduced to a small degree, but disadvantageous in that the coating resin is susceptible to damage during the operation of the water treatment. The second method (1–2) is advantageous in that it enables two different processings to be done at the same time; namely, water treatment and sintering to be done at the same time, but yet is disadvantageous in that it involves several difficult problems with respect to the required equipment. The last method (1–3) may be found advantageous in that the water treatment is done after the resin coating has attained sufficient mechanical strength and accordingly is the easiest to be carried out, even though the processing steps are not simultaneous.

When the forming or fabrication, for example, press-forming or the like, of the aluminum or the aluminum alloy resin-coated is carried out in accordance with the teachings of the present invention, the penetration of the oil barely takes place even after forming has been completed, presumably because the air gaps between the etched surface of the base metal, namely the aluminum or the aluminum alloy, and the resin coating is filled up as a result of the water treatment. When deformation of both the resin coating and the base metal, mechanically resulting from the applied forming or fabrication is not too extensive, (for example, deformation as expressed in terms of the Erichsen Value below about 7mm), and the resultant bonding strength and surface stain resistance exhibit almost no decrease for the kitchen utensil made of the aluminum or the aluminum alloy which is surface coated in accordance with the present invention and thereafter exposed to heated oil. This permits the provision of an excellent formed product having an improved corrosion resistance and a capability of being anodized.

Therefore, the formed or otherwise fabricated product which does not have an extensive deformation of the material, can well meet the requirements for use where the non-stickiness of the surface coating of a formed product is of primary importance. The aluminum or aluminum alloy, surface-coated in accordance with the present invention may be used as a material for making a frying pan, oven pan, scallop, ice cream scoop and all other kitchen utensils and a bearing, provides an unusually large wear resistance and compressive strength, in addition to the already mentioned advantages, when it has been oxidized on the etched surface by applying anodizing or other methods before application of the resin coating so that it can be utilized as a material for heavy duty bearing.

But the forming or fabrication, as for example by press-forming, spinning, drawing and other means, may often increase the ease of penetration of the oil through the coating resin to the aluminum or aluminum alloy surface coating resin, presumably because of the presence of air gaps between the base metal, namely the aluminum or the aluminum alloy, and the resin. When the mechanical deformation of the coating resin coated over aluminum or an aluminum alloy is extensive (for example, of the order of about 7mm as expressed in the terms of the Erichsen value), and accordingly the forming as described above has been made, a small drop of the bonding strength of the resin coating results after the immersion in heated oil for a prolonged period, and the surface stain represented by a yellowish brown color appears after use of the formed products after being exposed to the heat and oil for a long time, and corrosion, as small as it may be, takes place after immersion in an aqueous solution of sodium chloride for a prolonged period of time. Such difficulties may be removed by resorting to the method as described below.

First is a method by which the water treatment is carried out after forming the resin-coated aluminum or aluminum alloy; in other words, a method whereby the heating treatment in the heated water or in steam is carried out after forming or fabrication thereof into the frying pan, pot or the like, through application of press-forming, spinning, drawing or compression (FIG. 4). This method for removing the described difficulty is highly effective for assuring a very excellent quality in the formed product, especially when fabricated by deep drawing or spinning. This is to say that, as a result of the application of the present method, the air gap between the resin coating and base metal, caused by deformation of the resin coating seems to be filled up due to exposure of the resin-coated formed product to the heated water or to the steam thereby increasing the reluctance of the oil's penetration through the coating resin film and precluding the possibility of a decrease in the bonding strength of the resin coating even after immersion in the heated oil continued for a very long period. Barely any staining deemed attributable to the thermal decomposition of the oil penetrating through the resin coating appears, even after the use of the kitchen utensil for a very long continued use, and no corrosion whatsoever takes place after immersion in an aqueous solution of sodium chloride for a prolonged period. Anodizing applied to the exposed portion of the surface of the aluminum or aluminum alloy, for example on the outside surface of the pot or kettle, gives no color irregularity whatsoever on the surface with an expected satisfactory result for anodizing.

Another method of resin coating is after oxidation of the etched surface of the base metal, namely the aluminum or the aluminum alloy, by anodizing or chemical oxidizing to establish the aluminum oxide thereon to obtain specially an excellent wear resistance, compressive strength and corrosion resistance, in addition to the advantages offered by the previous method mentioned.

These advantages assure an unusually good quality of a formed product which has been to a large overall deformation of the resin-coated aluminum or aluminum alloy, for example, as a deep pot, a canteen for military use or the like, or a square container made by press-forming from a flat aluminum or aluminum alloy plate, with respect especially to every corner thereof.

The favorable advantages provided by the application of the present invention contribute the making of kitchen utensils formed from aluminum or an aluminum alloy and surface-coated pursuant to the invention, which are devoid of occurrences such as flaking, spalling or the like, of the resin coating after continued use for a prolonged period under exposure to the heated oil, and no staining occurs after use for a long period of time, which jointly assure the surface appearance of lasting beauty, as well as improvement of the corrosion resistance which permits the formed product to be used in surface contact with salt, soy sauce, vinegar or the like. Finally, the increase of its capability to be anodized on the exposed surface of the aluminum or aluminum alloy or on the outside of the formed product thereof, such as on a cauldron, frying pan or the like, in turn ensures an increased corrosion resistance which represents a reluctance to being stained thus appreciably increasing the commercial or market value of the formed product made of the aluminum or aluminum alloy and surface-coated in accordance with the present invention. The formed or otherwise fabricated product may be used for all uses for which non-stickiness of the surface of the product is one of the primary requirements, such as for frying pans, kettles, egg griddles, rice cauldrons, canteens for military use or the like, and many other kitchenwares as well as for bearing material. Moreover, the aluminum or the aluminum alloy which has received the oxidation on the etched surface thereof before surface coating with the resin pursuant to the invention, is favored by a large wear resistance and compressive strength in addition to the favorable advantages of the improved properties already described such that it can be used also to make heavy duty bearing material or the like.

Being versatile in application and providing various advantages already disclosed hereinbefore in this specification, the present invention is advantageously applicable to the coating of the aluminum or an aluminum alloy with a fluorocarbon resin best suited for the manufacture of all types of fabricated industrial products made of aluminum or an aluminum alloy which are surface-etched and coated with a fluorocarbon resin in accordance with the present invention, for example, fluorocarbon-coated plates, fluorocarbon-coated tubes and pipes, fluorocarbon-coated rods, fluorocarbon-coated foil made of aluminum or an aluminum alloy and formed or otherwise fabricated products, especially products formed or otherwise fabricated from fluorocarbon-coated aluminum or aluminum alloy and more particularly formed or fabricated products for which non-stickiness of the resin coating is of primary importance as for various kitchen tools and irons, or for formed or otherwise fabricated products employed to provide a sliding face for a bearing or the like.

The resin-coated aluminum or aluminum alloy, the etched surface of which is oxidized by anodizing by chemical oxidizing or other methods in accordance with the invention, has a specially great wear resistance and compressive strength of the resin coating, and accordingly may be specially recommended for use to make the formed or fabricated products to provide a sliding face for the heavy duty bearings or the like, and enables a substantial extension of the service life of the aforementioned kitchenwares and irons.

Although the descriptions of the invention have been made with a degree of particularity, it must be understood that the present disclosure has been made only by way of examples and that numerous changes in the details of the embodiment may be resorted to without departing from the spirit and the scope of the invention as hereinafter claimed.

We claim:

1. A method of coating a base metal surface of aluminum or an aluminum alloy with a fluorocarbon resin comprising the steps of treating the surface to be coated to provide fine surface irregularities and numerous pores therein for provision of an anchorage to arrest the resin to be coated thereon, coating the treated surface with a fluorocarbon resin, and exposing the resin coated metal to heated water or steam to cause hydration of said treated surface.

2. The method of claim 1 characterized by the step of oxidizing the treated base metal surface prior to the step of applying the fluorocarbon resin.

3. The method of claim 1 characterized by the step of shaping the base metal subsequent to the step of applying the fluorocarbon resin coating.

4. The method of claim 3 characterized by the step of thereafter exposing the shaped fluorocarbon resin coated metal surface to heated water or steam to cause hydration of said treated surface.

5. The method of claim 1 characterized by the step of drying and sintering the fluorocarbon-coated base metal surface.

6. The method of claim 5 characterized by the step of heat treating the resin-coated base metal surface by exposing the same to heated water or steam subsequent to the step of drying and prior to the step of sintering.

7. The method of claim 1 characterized by the step of sintering the fluorocarbon resin coated metal surface and subsequently heat treating the same by exposure to heated water or steam.

8. The method of claim 1 wherein the heated water or steam is maintained at a temperature in excess of 85° C.

9. A resin-coated aluminum or aluminum alloy base metal product having a surface portion thereof coated with a resin and manufactured by a process comprising the steps of treating the surface portion to be coated to provide fine surface irregularities and numerous pores therein for provision of an anchorage to arrest the resin to be coated thereon, coating the treated surface with a fluorocarbon resin, and exposing the resin-coated metal to heated water or steam to cause hydration of said treated surface.

10. The resin-coated aluminum or aluminum alloy base metal product of claim 9 wherein the treated base metal surface is oxidized prior to the step of applying the fluorocarbon resin.

* * * * *